United States Patent
Hosokawa et al.

(10) Patent No.: US 9,715,409 B2
(45) Date of Patent: Jul. 25, 2017

(54) JOB DELAY DETECTION METHOD AND INFORMATION PROCESSING APPARATUS

(71) Applicant: FUJITSU LIMITED, Kawasaki-shi, Kanagawa (JP)

(72) Inventors: Ikuko Hosokawa, Nagoya (JP); Shotaro Okada, Nishinomiya (JP); Tsuyoshi Honma, Nagoya (JP); Takahiro Inagaki, Ama (JP); Naoaki Ono, Nagoya (JP); Seiji Kambe, Gifu (JP); Haruki Hattori, Inazawa (JP); Masashi Katou, Nagoya (JP); Kazuyuki Tanaka, Kasugai (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/331,804

(22) Filed: Jul. 15, 2014

(65) Prior Publication Data

US 2015/0033233 A1 Jan. 29, 2015

(30) Foreign Application Priority Data

Jul. 25, 2013 (JP) ................................. 2013-154768

(51) Int. Cl.
*G06F 9/46* (2006.01)
*G06F 9/48* (2006.01)
(Continued)

(52) U.S. Cl.
CPC ............ *G06F 9/4887* (2013.01); *G06F 11/30* (2013.01); *G06F 11/3409* (2013.01); *G06F 11/3419* (2013.01); *G06F 2201/865* (2013.01)

(58) Field of Classification Search
CPC .. G06F 9/4843; G06F 9/5066; G06F 11/3476; G06F 9/52; G06F 11/1637; G06F 9/46
See application file for complete search history.

(56) References Cited

U.S. PATENT DOCUMENTS 7,086,063 B1* 8/2006 Ousterhout ............... G06F 8/45
711/118
2003/0005023 A1* 1/2003 Gilbert .................... H04L 41/08
718/101

(Continued)

FOREIGN PATENT DOCUMENTS

JP 2004-295731 A 10/2004
JP 2011-118794 A 6/2011
(Continued)

OTHER PUBLICATIONS

Japanese Office Action mailed Feb. 28, 2017 for corresponding Japanese Patent Application No. 2013-154768, with Partial English Translation, 7 pages.

*Primary Examiner* — Lewis A Bullock, Jr.
*Assistant Examiner* — Gilles Kepnang
(74) *Attorney, Agent, or Firm* — Fujitsu Patent Center

(57) ABSTRACT

An information processing apparatus includes a monitoring unit and a predicting unit. The monitoring unit monitors, during execution of a first job, the amount of data output by the execution of the first job. The predicting unit predicts, based on the amount of data output by the execution of the first job, whether execution of a second job finishes by a preset time limit. The second job performs a process using the data output by the execution of the first job.

10 Claims, 36 Drawing Sheets

(51) Int. Cl.
*G06F 11/30* (2006.01)
*G06F 11/34* (2006.01)

(56) References Cited

U.S. PATENT DOCUMENTS

| | | | | |
|---|---|---|---|---|
| 2006/0048155 A1* | 3/2006 | Wu | .................. | G06F 9/4843 |
| | | | | 718/101 |
| 2008/0288948 A1* | 11/2008 | Attarde | ................ | G06F 3/0613 |
| | | | | 718/103 |
| 2010/0042998 A1* | 2/2010 | Abdelnur | .............. | G06F 9/4843 |
| | | | | 718/101 |
| 2011/0138397 A1* | 6/2011 | Kikuchi | ............. | G06F 11/3476 |
| | | | | 718/106 |
| 2011/0161959 A1* | 6/2011 | Sharon | ................ | G06F 9/4843 |
| | | | | 718/101 |
| 2012/0150528 A1* | 6/2012 | Upadhyaya | ........... | G06F 9/4843 |
| | | | | 704/2 |
| 2012/0167101 A1* | 6/2012 | Kandula | .............. | H04L 67/325 |
| | | | | 718/102 |
| 2012/0210323 A1* | 8/2012 | Hosouchi | ............. | G06F 9/5038 |
| | | | | 718/102 |
| 2014/0215487 A1* | 7/2014 | Cherkasova | .......... | G06F 9/5066 |
| | | | | 718/106 |

FOREIGN PATENT DOCUMENTS

| | | |
|---|---|---|
| JP | 2012-128770 | 7/2012 |
| JP | 2012-173756 | 9/2012 |

\* cited by examiner

211 JOB DEFINITION INFORMATION

| JOB NET NAME | JOB NAME | INPUT FILE | OUTPUT FILE | EXTRACTION JOB FLAG |
|---|---|---|---|---|
| jobnet001 | job001 | input001 | data1 | ON |
| jobnet001 | job002 | data1 | output1 | OFF |
| jobnet002 | job101 | input002 | data2 | ON |
| jobnet002 | job102 | data2 | output2 | OFF |

212 OPERATION RESULT MANAGEMENT TABLE

| | JOB NET NAME | JOB NAME | EXECUTION TIME | INPUT FILE | INPUT FILE SIZE | OUTPUT FILE | OUTPUT FILE SIZE |
|---|---|---|---|---|---|---|---|
| FIRST TEST | jobnet001 | job001 | 10m11s | data1 | 1.33GB | outdata01 | 1.68GB |
| SECOND TEST | jobnet001 | job001 | 22m48s | data1 | 2.81GB | outdata01 | 2.98GB |
| THIRD TEST | jobnet001 | job001 | 66m21s | data1 | 8.43GB | outdata01 | 9.11GB |

FIG. 8

214  EXECUTION TIME INFORMATION LIST

| JOB NET NAME | JOB NAME | AVERAGE EXECUTION TIME | MINIMUM EXECUTION TIME | MAXIMUM EXECUTION TIME |
|---|---|---|---|---|
| jobnet001 | job002 | 01h10m10s | 00h30m30s | 03h30m30s |
| jobnet001 | job004 | 02h20m20s | 01h30m30s | 03h30m30s |
| jobnet002 | job102 | 03h30m30s | 02h30m30s | 04h30m30s |
| jobnet002 | job104 | 05h50m50s | 03h30m30s | 06h30m30s |
| jobnet003 | job202 | 04h40m40s | 04h30m30s | 05h30m30s |

FIG. 10

212 OPERATION RESULT MANAGEMENT TABLE

| | JOB NET NAME | JOB NAME | EXECUTION TIME | INPUT FILE | SIZE | INPUT FILE SIZE RATIO | EXECUTION TIME RATIO | CORRELATION VALUE |
|---|---|---|---|---|---|---|---|---|
| FIRST TEST | jobnet001 | job001 | 10m11s | data1 | 1.33GB | BASE | BASE | — |
| SECOND TEST | jobnet001 | job001 | 22m48s | data1 | 2.81GB | 2.11278 | 2.23895 | 1.059718 |
| THIRD TEST | jobnet001 | job001 | 66m21s | data1 | 8.43GB | 6.33834 | 6.51555 | 1.027958 |
| | | | | | | | AVERAGE CORRELATION VALUE → | 1.043838 |

FIG. 22

211 JOB DEFINITION INFORMATION (AFTER REGISTRATION OF CORRELATION FORMULA)

| JOB NET NAME | JOB NAME | INPUT FILE | OUTPUT FILE | EXTRACTION JOB FLAG | CORRELATION FORMULA |
|---|---|---|---|---|---|
| jobnet001 | job001 | input001 | data1 | ON | &time ÷ 611 ÷ 1.043838 × 1.33GB |
| jobnet001 | job002 | data1 | output1 | OFF | |

FIG. 23

50 POTENTIAL MONITORING TARGET LIST SCREEN
51

| JOB NET NAME | JOB NAME | MAXIMUM EXECUTION TIME | AVERAGE EXECUTION TIME | SCHEDULED END TIME |
|---|---|---|---|---|
| jobnet002 | job104 | 06h30m30s | 05h50m50s | |
| jobnet003 | job202 | 05h30m30s | 04h40m40s | |
| jobnet002 | job102 | 04h30m30s | 03h30m30s | |
| jobnet001 | job004 | 03h30m30s | 02h20m20s | |
| jobnet001 | job002 | 03h30m30s | 01h10m10s | |

SET

50 POTENTIAL MONITORING TARGET LIST SCREEN

| JOB NET NAME | JOB NAME | MAXIMUM EXECUTION TIME | AVERAGE EXECUTION TIME | SCHEDULED END TIME |
|---|---|---|---|---|
| jobnet002 | job104 | 06h30m30s | 05h50m50s | 6:00 |
| jobnet003 | job202 | 05h30m30s | 04h40m40s | 1:00 |
| jobnet002 | job102 | 04h30m30s | 03h30m30s | 0:00 |
| jobnet001 | job004 | 03h30m30s | 02h20m20s | 2:30 |
| jobnet001 | job002 | 03h30m30s | 01h10m10s | 0:00 |

SET

FIG. 31

115 MONITORING TARGET JOB LIST

| EXTRACTION JOB | | EXTRACTION FILE | MODIFICATION JOB | | SCHEDULED END TIME | CORRELATION FORMULA |
|---|---|---|---|---|---|---|
| JOB NET NAME | JOB NAME | | JOB NET NAME | JOB NAME | | |
| jobnet001 | job001 | data1 | jobnet001 | job002 | 0:00:00 | ..... |
| jobnet002 | job101 | data2 | jobnet002 | job102 | 0:00:00 | ..... |

FIG. 32

115 MONITORING TARGET JOB LIST (DURING DELAY PREDICTION)

| EXTRACTION JOB | | EXTRACTION FILE | MODIFICATION JOB | | SCHEDULED END TIME | CORRELATION FORMULA | EXTRACTED DATA SIZE | DATA SIZE UPPER LIMIT |
|---|---|---|---|---|---|---|---|---|
| JOB NET NAME | JOB NAME | | JOB NET NAME | JOB NAME | | | | |
| jobnet001 | job001 | data1 | jobnet001 | job002 | 0:00:00 | .... | 0.783GB | 5.105GB |
| jobnet002 | job101 | data2 | jobnet002 | job102 | 0:00:00 | .... | | 6.221GB |

FIG. 34

115 MONITORING TARGET JOB LIST (WHEN ALARM IS ACTIVATED)

| EXTRACTION JOB | | EXTRACTION FILE | MODIFICATION JOB | | SCHEDULED END TIME | CORRELATION FORMULA | EXTRACTED DATA SIZE | DATA SIZE UPPER LIMIT |
|---|---|---|---|---|---|---|---|---|
| JOB NET NAME | JOB NAME | | JOB NET NAME | JOB NAME | | | | |
| jobnet001 | job001 | data1 | jobnet001 | job002 | 0:00:00 | ..... | 3.114GB | 3.101GB |
| jobnet002 | job101 | data2 | jobnet002 | job102 | 0:00:00 | ..... | | 6.221GB |

60 ALARM DISPLAY SCREEN

DELAY IN JOB NET EXECUTION HAS BEEN PREDICTIVELY DETECTED
DETECTED TIME: 1/20 1:11:45 a.m.

JOB NET NAME : jobnet001
JOB NAME BEING IN EXECUTION (PRECEDING JOB NAME) : job003

MONITORING TARGET JOB NAME (DELAY-EXPECTED JOB NAME) : job004
ESTIMATED EXECUTION TIME OF MONITORING TARGET JOB : 3 h 20 m 25 s
EXPECTED EXECUTION END TIME OF MONITORING TARGET JOB : 1/20 4:32:10 a.m.
STATUS OF MONITORING TARGET JOB : EXECUTION WAIT The size of input file (process file) of job004 has exceeded the projected size.
As a result, the execution time of job004 is likely to increase and exceed the scheduled end time (3 h 00 m 00 s).
Adjustments in the following jobs as appropriate are recommended.

| LIST OF JOBS FOLLOWING job003 | INFORMATION OF JOBS FOLLOWING job004 |
|---|---|
| job0041<br>job0042 | job005->job006->job007->job008 |

JOB DELAY DETECTION METHOD AND INFORMATION PROCESSING APPARATUS

CROSS-REFERENCE TO RELATED APPLICATION

This application is based upon and claims the benefit of priority of the prior Japanese Patent Application No. 2013-154768, filed on Jul. 25, 2013, the entire contents of which are incorporated herein by reference.

FIELD

The embodiments discussed herein are related to a job delay detection method and an information processing apparatus used when executing a plurality of jobs.

BACKGROUND

Some processes executed in a computer system have a limited time frame for the execution. In the case of batch processing, for example, a period following the end of online services of the previous day up to prior to the start of online services of the following day (referred to as the 'deadline') may be designated as the time frame allowed to execute the batch processing. The batch processing is achieved, for example, by executing a plurality of jobs in a predetermined order. Therefore, in the computer system, the start of the execution of each job is scheduled in such a manner that all jobs included in the batch processing are executed within the designated time frame.

Note, however, that it is sometimes the case that a job may not be performed according to the scheduled execution time. In this regard, at many operation sites, an operator monitors delays in the batch processing.

Delays are monitored according to the following procedure, for example:

(1) An administrator of a system derives a critical path based on past execution history data (operation results) and monitors the execution status of jobs on the critical path. The critical path is information related to, among job groups each containing one or more jobs with dependency constraints (job nets), a job group having the sequence of jobs which add up to the longest overall duration, and indicates the execution order of the jobs of the longest path. If the execution of a job on the critical path is late, the process completion time of the entire job nets is delayed. In view of this, the administrator selects jobs on the critical path as monitoring targets. For example, jobs with a long execution time and jobs whose execution time is likely to change significantly are selected as the monitoring targets.

(2) The administrator defines the monitoring target jobs in the system, together with their scheduled end times serving as criteria for delay determination.

(3) The system activates an alarm if the execution of each monitoring target job is not finished when the scheduled end time has arrived.

Note that a technology has been proposed which completes a batch job by a predetermined time even when the amount of data handled in batch processing has changed or when a failure has occurred in a batch processing system.

Japanese Laid-open Patent Publication No. 2012-128770

However, detecting a delay in a monitoring target job at the scheduled end time may be too late, thus making it difficult to deal with the delay. For example, if the occurrence of the job delay is predicted at an early stage, the batch processing may be still made to finish at the scheduled time by reserving the execution of less important jobs for the following day. On the other hand, when the job delay is detected just before the start of online services, unprocessed jobs may contain no jobs to be reserved for the following day. In such a case, the batch processing is not completed within the time frame allowed for the execution.

SUMMARY

According to one embodiment, there is provided a non-transitory computer-readable recording medium storing therein a computer program that causes a computer to perform a process including monitoring, during execution of a first job, the amount of data output by the execution of the first job; and predicting, based on the amount of data output by the execution of the first job, whether execution of a second job finishes by a preset time limit. The second job performs a process using the data output by the execution of the first job.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of an operation result management table;

FIG. 10 illustrates an example of an execution time information list;

FIG. 22 illustrates an example of an updated operation result management table;

FIG. 23 illustrates an example of job definition information in which a correlation formula is registered;

FIG. 30 illustrates an example of a potential monitoring target list screen;

FIG. 31 is an example of the potential monitoring target list screen after scheduled end times are input;

FIG. 32 illustrates an example of a monitoring target job list;

FIG. 34 illustrates an example of the monitoring target job list during the delay prediction process;

FIG. 35 illustrates an example of the monitoring target job list when an alarm is activated; and FIG. 36 illustrates an example of an alarm display screen.

DESCRIPTION OF EMBODIMENTS

Figure 1:
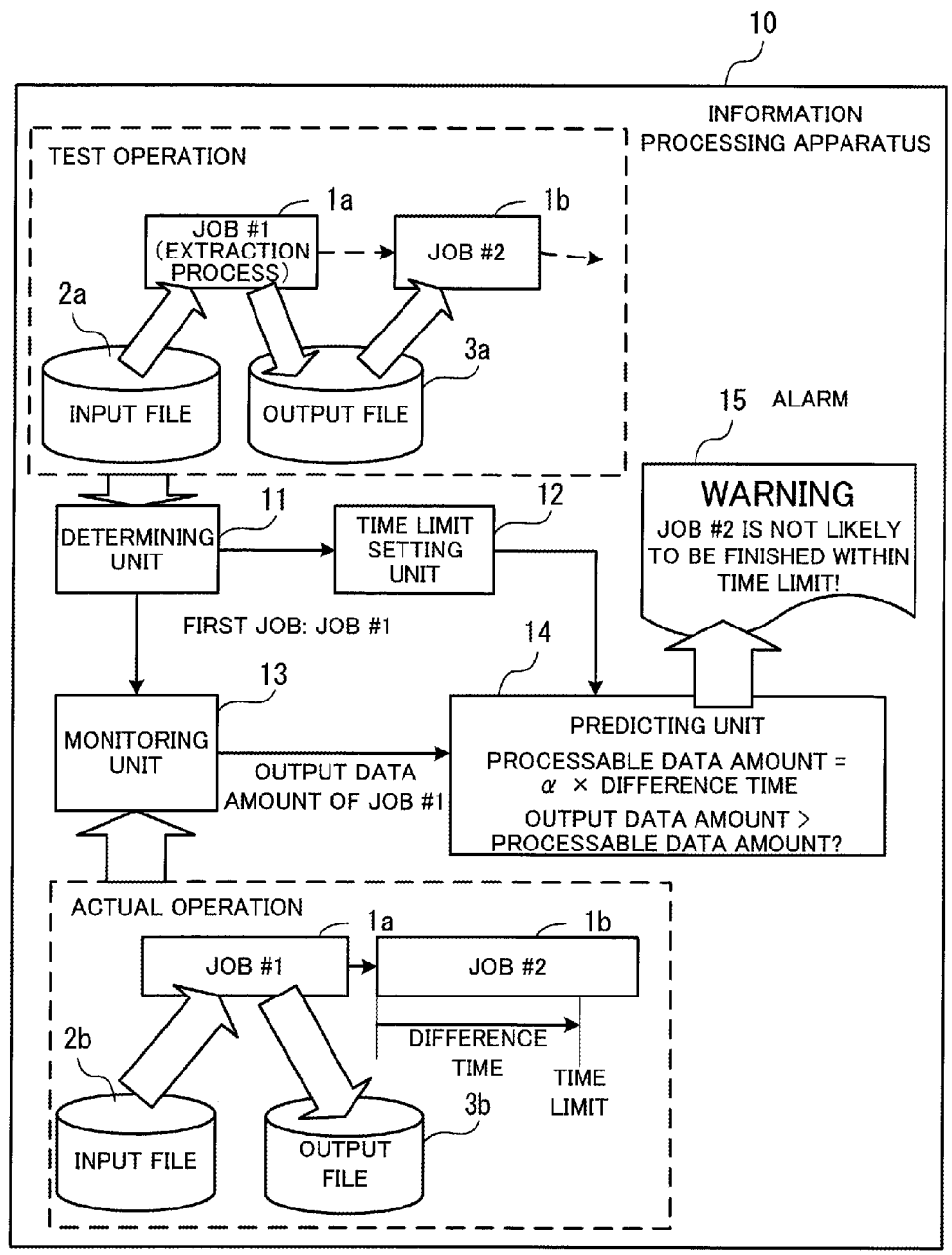
FIG. 1 illustrates an example of a functional configuration of an information processing apparatus according to a first embodiment.

Several embodiments will be described below with reference to the accompanying drawings, wherein like reference numerals refer to like elements throughout. Note that two or more of the embodiments below may be combined for implementation in such a way that no contradiction arises.

(a) First Embodiment

FIG. 1 illustrates an example of a functional configuration of an information processing apparatus according to a first embodiment. An information processing apparatus 10 of the first embodiment includes a determining unit 11, a time limit setting unit 12, a monitoring unit 13, and a predicting unit 14.

The determining unit 11 determines, as a first job amongst a plurality jobs 1a, 1b, and so on to be executed, a job of extracting records satisfying an extraction condition from an input file and outputting the extracted records (hereinafter, referred to as the 'extraction job'). For example, the determining unit 11 determines the first job based on operations of the plurality of jobs 1a, 1b, and so on during a test operation.

In the test operation, jobs are executed in an order preliminarily indicated by, for example, job nets. For example, first, the job 1a is executed in which a plurality of records are read from an input file 2a and records satisfying an extraction condition are written to an output file 3a. Next, the job 1b is executed in which the records written to the output file 3a are read and then individually modified. The determining unit 11 analyzes the processes executed by the jobs 1a and 1b, and then recognizes that the job 1a is an extraction job of performing a record extraction process. Subsequently, the determining unit 11 notifies the time limit setting unit 12 and the monitoring unit 13 of, for example, identification information 'job#1' of the first job.

The time limit setting unit 12 sets the time limit for finishing the execution of a second job which uses data output by the execution of the first job for its processing. According to the example of FIG. 1, the job 1a is the first job and the job 1b is the second job. For example, the time limit setting unit 12 displays the second job on a monitor to receive an input of the time limit of the second job from a user. Alternatively, the time limit setting unit 12 may obtain an average execution time of the second job based on results of the test operation and then set the time limit based on the average execution time. The time limit may be obtained by adding, for example, the product of the average execution time and a coefficient of 1 or more to the start time of the execution of the second job. The time limit setting unit 12 notifies the predicting unit 14 of the set time limit.

The monitoring unit 13 monitors the amount of data output by the execution of the first job (the output data amount) during the execution of the first job. For example, once the execution of the jobs 1a, 1b, and so on is started in an actual operation, the monitoring unit 13 periodically measures the data amount output by the execution of the job 1a determined as the first job.

According to the example of FIG. 1, when the job 1a determined as the first job is executed, records in an input file 2b are read and then records satisfying an extraction condition are written to an output file 3b. Therefore, the monitoring unit 13 designates, for example, the size of the output file 3b as the output data amount of the job 1a. The monitoring unit 13 notifies the predicting unit 14 of the output data amount of the job 1a.

Based on the data amount output by the execution of the first job, the predicting unit 14 predicts whether the execution of the second job which uses the data output by the execution of the first job for its processing is finished by the predetermined time limit. For example, the predicting unit 14 compares the data amount output by the execution of the first job and the data amount processable by the execution of the second job before the time limit expires, to thereby predict whether the execution of the second job is finished by the time limit. The data amount processable before the expiration of the time limit is calculated, for example, by multiplying a difference time between the start time of the second job and the time limit by a constant $\alpha$ ($\alpha$ is a positive real number). $\alpha$ is the data amount processable per unit time. The value of $\alpha$ may be measured during the test operation. The start time of the second job is estimated, for example, based on the current time and the remaining processing time of the first job. The remaining processing time of the first job may be calculated by dividing the number of unprocessed records in the input file 2b by the number of records processable per unit time. Note that when it is known that the processing time of the first job is quite short compared to the processing time of the second job, the current time may be set as the start time of the second job.

The predicting unit 14 may also estimate the execution time of the second job based on the data amount output by the execution of the first job. In this case, the predicting unit 14 predicts, based on the estimated execution time, whether the execution of the second job is finished by the predetermined time limit.

Further, the predicting unit 14 activates an alarm 15 at the point, for example, when the data amount output by the execution of the first job exceeds the data amount processable by the execution of the second job before the expiration of the time limit. The alarm 15 is displayed on the monitor.

According to the information processing apparatus 10 described above, the first job is determined by the determining unit 11 during the test operation of the plurality of jobs 1a, 1b, and so on. Next, the time limit setting unit 12 sets a time limit for the end of the execution of the second job which uses the output file of the first job. Subsequently, when the actual operation of the jobs 1a, 1b, and so on is started, the monitoring unit 13 monitors the output data amount of the job 1a. Then, based on the output data amount, the predicting unit 14 predicts whether the execution of the job 1b is finished within the time limit. When predicting that the execution of the job 1b is not finished within the time limit, the predicting unit 14 activates the alarm 15.

In this manner, it is possible to notify the user during the execution of the first job preceding the second job about the execution of the second job being unlikely to be finished by the time limit. That is, job delay is predictively detected at an earlier stage compared to the case of detecting the job delay by recognizing at the time limit that the second job is not yet finished. A preliminary detection of the occurrence of the job delay facilitates subsequent responses. For example, when a deadline has been set as in the case of batch processing, the execution of low-priority jobs may be reserved for the following day so that the batch processing is finished by the deadline even if a delay occurs in an intermediate job.

Note here that, when the first job is an extraction job, it is important to find the extraction job with a high degree of accuracy. An extraction job is characterized by reading all records from an input file by a predetermined amount each time. In view of this, the determining unit 11 judges whether to determine a job as the first job, based on whether the job reads all the records from the input file by a predetermined amount each time when the job is executed.

In addition, an extraction job is characterized by outputting, amongst a plurality of records in the input file, records satisfying an extraction condition without modifying them. In view of this, the determining unit 11 judges whether to determine a job as the first job, based on whether the job outputs, amongst the records in the input file, records satisfying an extraction condition without modifying them when the job is executed.

An extraction job is also characterized that, in the case of having output data to a plurality of files, identification information of each of the plurality of files is designated in a file defining extraction conditions. In view of this, the determining unit 11 refers to the file defining extraction conditions in the case where data has been output to a plurality of files by the execution of a job. Then, the determining unit 11 judges whether to determine the job as the first job, based on whether the identification information of each of the plurality of files is designated in the file defining extraction conditions.

Further, an extraction job is characterized that, in the case where extraction conditions are defined in a file, the file is read in a single read process. In view of this, the determining unit 11 judges whether to determine a job as the first job, based on whether the file defining extraction conditions has been read in a single read process.

Note that to determine the first job, the determining unit 11 may use a combination of one or more of the above characteristics of an extraction job.

In the above-described manner, according to the first embodiment, it is possible to achieve delay prediction prior to the start of the execution of a long run job. That is, whether a modification process becomes prolonged or not depends on the results of its preceding extraction process. As the size of data extracted as the results of the extraction process is larger, the execution of the subsequent process takes a longer time. Therefore, detecting a job performing an extraction process and focusing on the output data amount of the job enables delay prediction prior to the start of the execution of a long run job.

Note that the information processing apparatus 10 is, for example, a computer provided with a processor and memory. In this case, for example, the processor of the information processing apparatus 10 executes a program stored in the memory to thereby implement the determining unit 11, the time limit setting unit 12, the monitoring unit 13, and the predicting unit 14. In FIG. 1, each line connecting the individual components represents a part of communication paths, and communication paths other than those illustrated in FIG. 1 are also configurable.

(b) Second Embodiment

A second embodiment is described next. The second embodiment is directed to generating, by a server in a test environment, information used for detecting job delay, such as evaluation function equations, and then detecting, by a server in an operational environment, job delay during batch processing based on the generated information.

Figure 2:
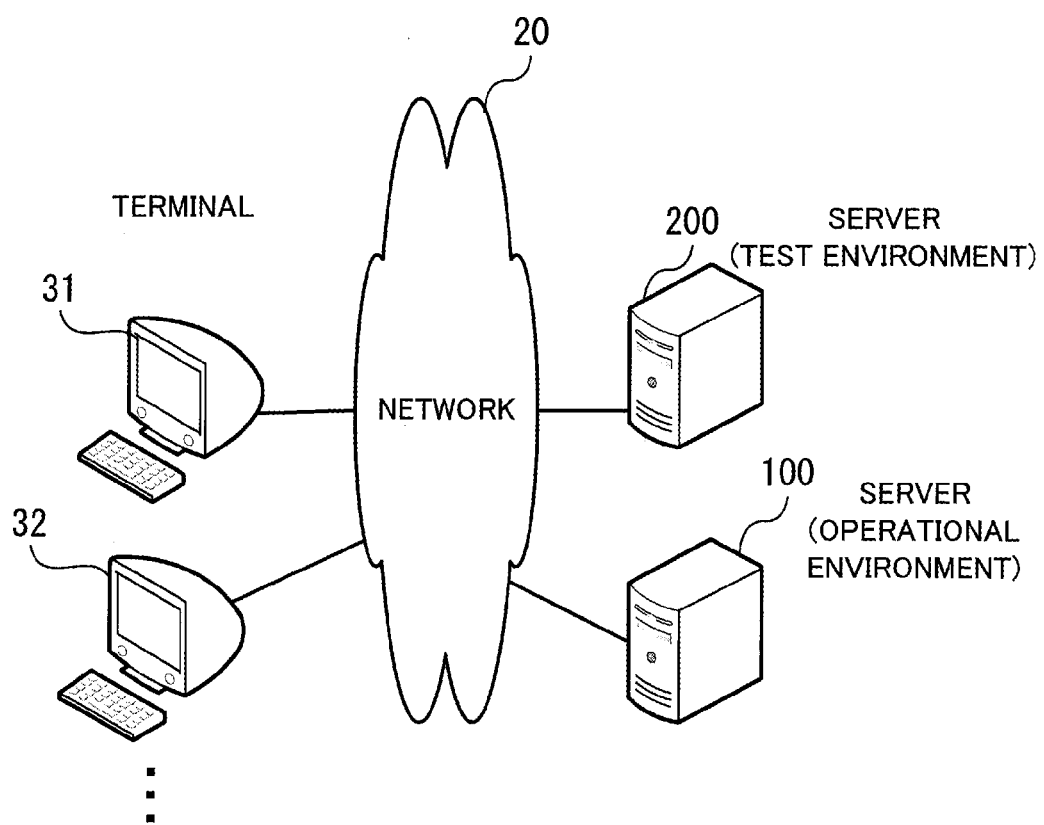
FIG. 2 illustrates an example of a system configuration according to a second embodiment.

FIG. 2 illustrates an example of a system configuration according to the second embodiment. A plurality of servers 100 and 200 and a plurality of terminals 31, 32, and so on are connected via a network 20. The server 100 is a computer in an operational environment, and engages in the execution of online services and batch processing. The server 200 is a computer in a test environment, and runs tests for online services and batch processing.

Using such a system, for example, the online services are executed in the server 100 during daytime hours, and the batch processing is executed in the server 100 during nighttime hours. The batch processing is, for example, to collectively treat various types of data accumulated during the online services. The batch processing is implemented by combining a plurality of jobs. Each of the jobs when executed reads data from an input file and processes the read data. A large majority of jobs involve a process of writing data into an output file in order to transfer the data to a subsequent job. Combining such jobs allows intended data to be output eventually. An example of such is account title-based sales of the day being stored in a sales master database.

In such areas of job management, the following environmental changes have occurred.

Increase in Jobs with an Extended Execution Time Due to Expansion of Processing Target Data In the batch processing within an information and communication technology (ICT) system supporting business management activities, for example, not backbone processes but information-related processes have increased. An example of the backbone processes is to reserve stock based on Point of Sales system (POS) data (store sales data) and place an order to cover a shortfall in the stock. On the other hand, an example of the information-related processes is to analyze a huge variety and amount of information, including trends in sales in past and current POS data and word-of-mouth information, such as blogs, and predict best selling products.

The amount of data handled in the information-related processes is of a quite different order of magnitude from the backbone processes. Therefore, when the data of the information-related processes is processed in the batch processing, the execution of jobs takes a whole lot more time compared to jobs for processing data of the backbone processes.

Shortening of the Release Interval of Application Software (Hereinafter Referred to as the 'Application') to be Run as Batch Jobs Applications executed in the batch processing for the information-related processes have a very short life cycle compared to those used for the backbone processes. For example, in the information-related processes, changes, such as adding a new data type as an analytical input, are made very frequently. In addition, due to advances in the development environment and frameworks (FW), the amount of coding has been reduced. As a result, the release interval of applications has been reduced. For example, it is sometimes the case that an updated version of an application is released as often as every week.

Improved Reliability Expected of Systems

In the case of banking services, the amount of data temporarily increases due to an external factor. For example, data inputs way beyond the amount originally projected are made due to a flood of deposits of donations at the time of disaster. As a result, a delay in the batch processing is likely to occur, which may cause the online services to stop. As for systems, especially ones supporting social infrastructure like banking systems, it is important to be able to properly process suddenly increased data amount even way beyond the original projection.

Note here that paying attention to the scheduled end time of a job designated as a monitoring target does not allow detection of job delay before the scheduled end time. For example, in the case where the execution of the monitoring target job takes four hours under normal conditions, whether a delay has occurred is determined only after four hours have elapsed after the start of the execution of the monitoring target job. As the execution time of the monitoring target job in normal operation becomes longer due to an increase in the amount of data to be processed, the delay determination also takes longer.

Further, shortening of the release interval of each application makes it difficult to accurately estimate the execution time of the monitoring target job in normal operation. For example, when changes, such as adding data to be analyzed and changing an analysis logic, are made to an application, it is not possible to accurately estimate the execution time based on operation result data prior to the latest release date. In the case of not being able to accurately estimate the execution time of the monitoring target job in normal operation, the scheduled end time is set by allocating a longer execution time. As a result, it takes even longer to determine the presence or absence of a delay.

If it takes long to detect a delay in the execution of a job, the batch processing may not finish within a time frame allowed for the execution, preventing the start of online services. This results in a decrease in the reliability of the system.

One possible cause of a delay in job execution during the batch processing is an increase in the data amount to be processed by jobs. Note however that, among jobs executed during the batch processing, some jobs are affected by the increase in the data amount and their processing is extended for a long period of time whilst others remain unaffected.

Figure 3:
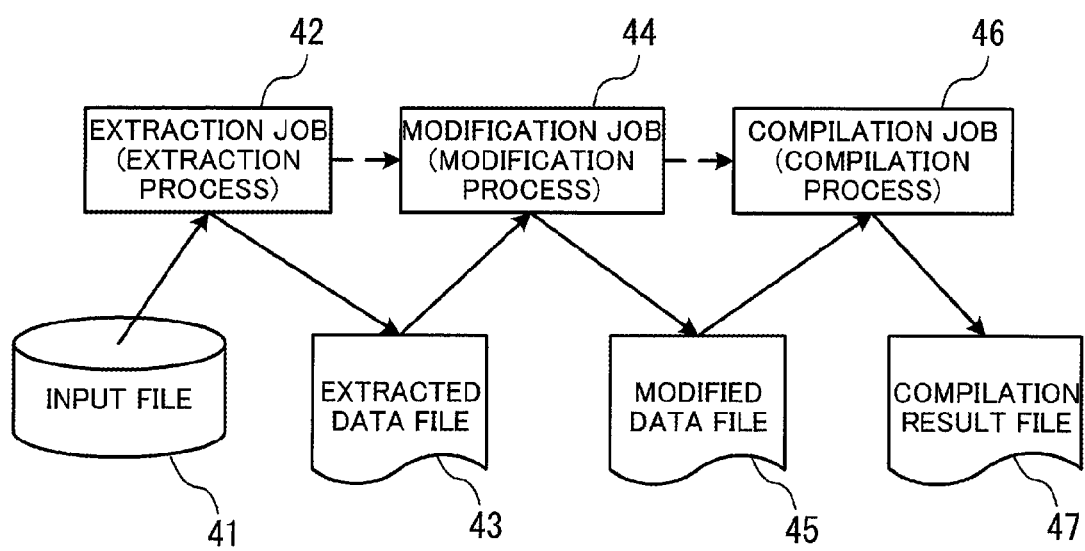
FIG. 3 illustrates an example of batch processing.

FIG. 3 illustrates an example of batch processing. First, the server 100 executes an extraction job 42 of extracting data from an input file 41. By the execution of the extraction job 42, for example, data satisfying a predetermined extraction condition is extracted from the input file 41. The server 100 outputs the extracted data to a file (an extracted data file 43).

Once having finished the data extraction, the server 100 executes a modification job 44 of modifying the data in the extracted data file 43. By the execution of the modification job 44, data format conversion, data coupling, cross-data references, sort processing, and data analysis are, for example, performed. The server 100 outputs the modified data to a modified data file 45. Once having finished the data modification, the server 100 executes a compilation job 46 of compiling the modified data. The server 100 outputs the compiled data to a compilation result file 47.

In the case where the batch processing is carried out in such a sequence, the execution of the data extraction process takes only a small amount of time in the whole batch processing. On the other hand, as for the modification process and the compilation process, the processing time tends to be proportional to the amount of data. Therefore, as the size of the extracted data file 43 becomes larger, the modification process and the compilation process take longer.

The second embodiment is directed to enabling estimation of a job execution time even in the case of a sudden increase in the amount of data to be processed, without depending on operation result data accumulated in an environment where the batch processing is in progress. That is, a system according to the second embodiment selects monitoring target jobs and derives a correlation between the input data size and the execution time of each of the monitoring target jobs at the test-operation stage before the batch processing enters the actual operation. Then, using the derived correlations, the system detects a delay in the batch processing in the actual operation.

The following describes a process flow to achieve an early detection of job delay.

At the Time of Test Operation

[First Step] The server 200 automatically detects extraction jobs from among all jobs and also obtains operation result data of all the jobs.

Preparation Prior to Actual Operation

[Second Step] The server 200 analyzes the relationship between the size of data extracted by each of the extraction jobs and the execution time of a job performing a subsequent modification process (modification job), and stores a correlation formula as attribute information of the modification job.

[Third Step] The server 100 displays the modification jobs as 'potential monitoring targets'. In this regard, the server 100 displays a list of the potential monitoring targets in descending order of the length of the execution time so as to make clear priorities. An administrator engaged in the operation sets, in the server 100, a scheduled end time of each potential monitoring target.

At the Time of Actual Operation

[Fourth Step] The server 100 monitors the size of data extracted by each of the extraction jobs.

The above-described configuration allows an early predictive detection of job delay. Note that the second step may be carried out by the server 100 in the operational environment (hereinafter, simply referred to as the 'operational environment server 100'). In addition, the third step may be carried out by the server 200 in the test environment (the 'test environment server 200').

Figure 4:
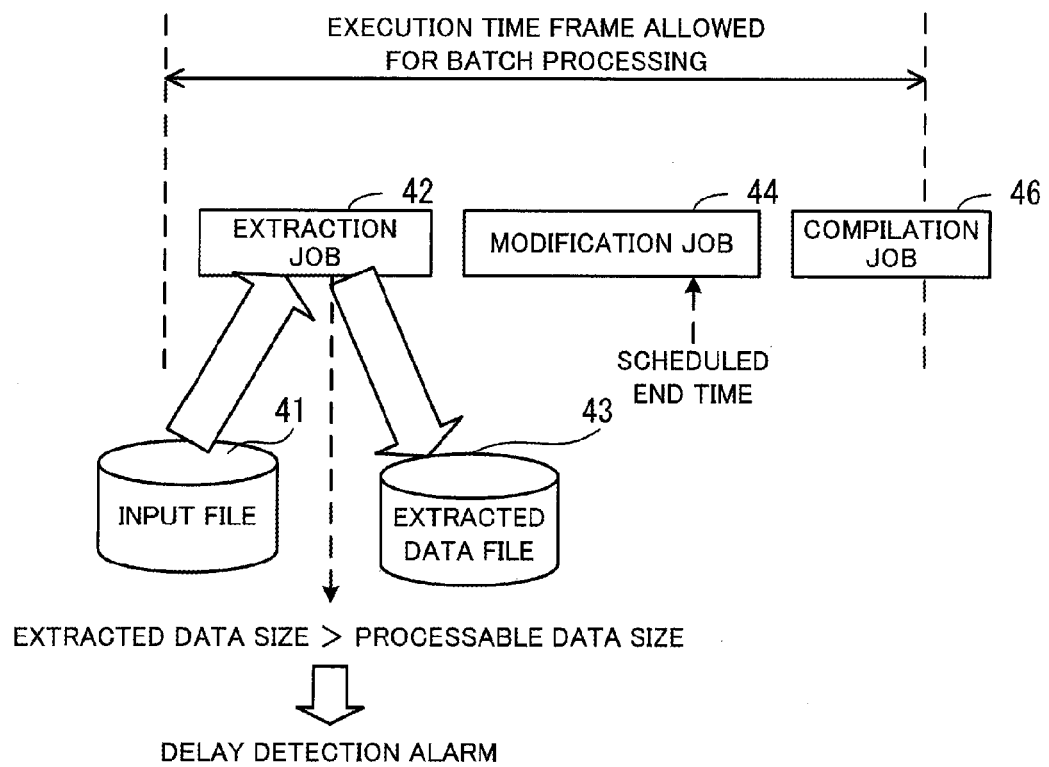
FIG. 4 illustrates a monitoring process in an actual operation.

FIG. 4 illustrates a monitoring process in the actual operation. When the extraction job 42 is being executed, the server 100 calculates, using a corresponding correlation formula, a processable data size within a predetermined period of time based on the difference between the scheduled end time of the modification job 44 using the extracted data as its input and the current monitoring time. Then, the server 100 sets off a delay detection alarm at the point in time when the size of the extracted data has exceeded the processable data size.

This allows an early detection of delay during the execution of the extraction job 42 based on the size of the extracted data. That is, the timing of outputting an alarm is brought forward compared to the case of raising an alarm after detecting the modification job 44 having yet to be actually completed at the scheduled end time. As a result, delay is detected well in advance before the end of the execution time frame allowed for the batch processing, which enables implementation of measures to finish the batch processing within the allowed execution time frame in good time.

Figure 5:
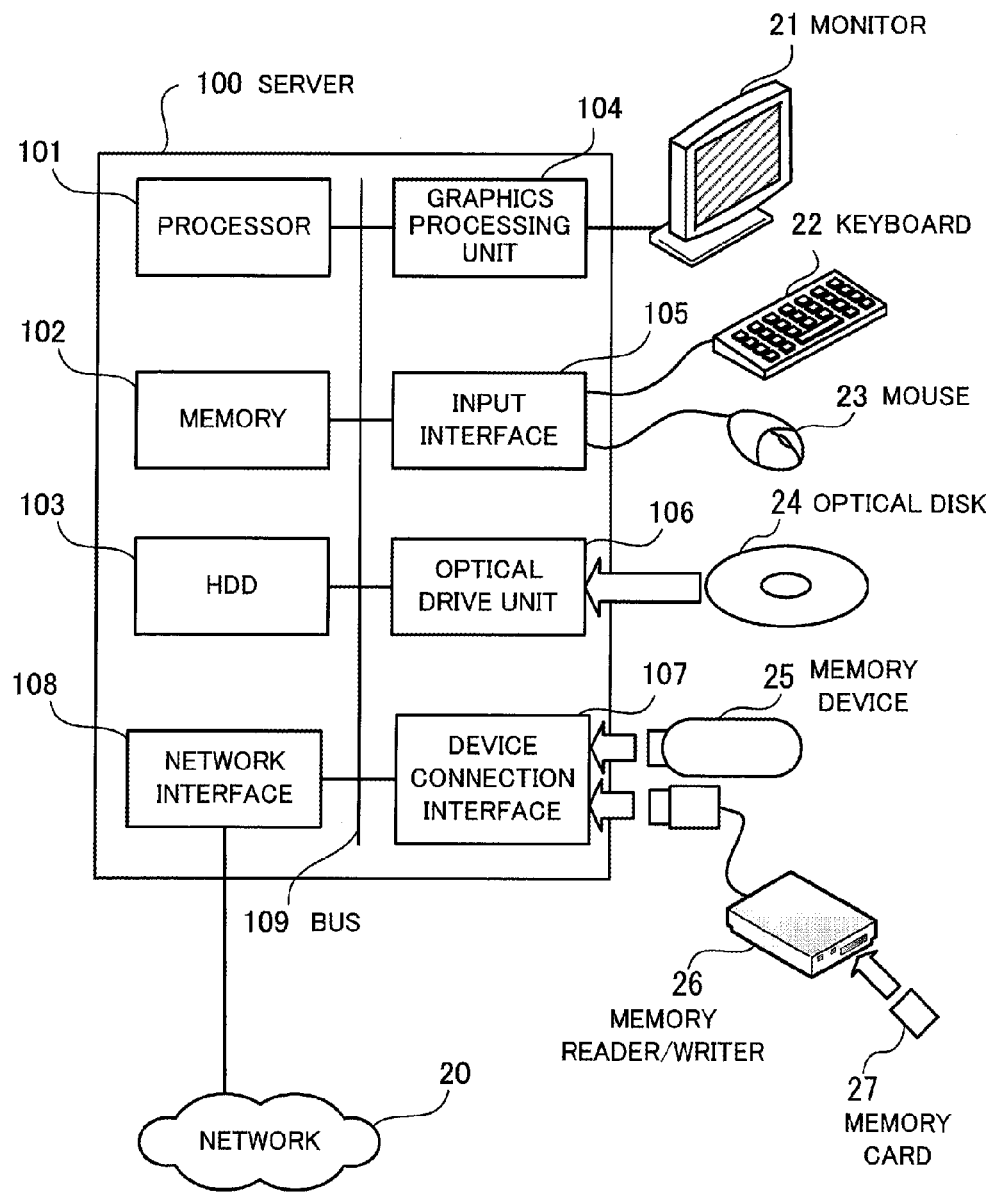
FIG. 5 is an example of a hardware configuration of a server.

Next described in detail is a system for achieving such delay detection. FIG. 5 is an example of a hardware configuration of a server. Overall control of the server 100 is exercised by a processor 101. To the processor 101, a memory 102 and a plurality of peripherals are connected via a bus 109. The processor 101 may be a multi-processor. The processor 101 is, for example, a central processing unit (CPU), a micro processing unit (MPU), or a digital signal processor (DSP). At least part of the functions of the processor 101 may be implemented as an electronic circuit, such as an application specific integrated circuit (ASIC) and a programmable logic device (PLD).

The memory 102 is used as a main storage device of the server 100. The memory 102 temporarily stores at least part of an operating system (OS) program and application programs to be executed by the processor 101. The memory 102 also stores therein various types of data to be used by the processor 101 for its processing. As the memory 102, a volatile semiconductor storage device such as a random access memory (RAM) may be used.

The peripherals connected to the bus 109 include a hard disk drive (HDD) 103, a graphics processing unit 104, an input interface 105, an optical drive unit 106, a device connection interface 107, and a network interface 108.

The HDD 103 magnetically writes and reads data to and from a built-in disk, and is used as a secondary storage device of the server 100. The HDD 103 stores therein the OS program, application programs, and various types of data. Note that a non-volatile semiconductor storage device such as a flash memory may be used as a secondary storage device in place of the HDD 103.

To the graphics processing unit 104, a monitor is connected. According to an instruction from the processor 101, the graphics processing unit 104 displays an image on a screen of the monitor 21. A cathode ray tube (CRT) display or a liquid crystal display, for example, may be used as the monitor 21.

To the input interface 105, a keyboard 22 and a mouse 23 are connected. The input interface 105 transmits signals sent from the keyboard 22 and the mouse 23 to the processor 101. Note that the mouse 23 is just an example of pointing devices, and a different pointing device such as a touch panel, a tablet, a touch-pad, and a track ball, may be used instead.

The optical drive unit 106 reads data recorded on an optical disk 24 using, for example, laser light. The optical disk 24 is a portable recording medium on which data is recorded in such a manner as to be read by reflection of light. Examples of the optical disk 24 include a digital versatile disc (DVD), a DVD-RAM, a compact disk read only memory (CD-ROM), a CD recordable (CD-R), and a CD-rewritable (CD-RW).

The device connection interface 107 is a communication interface for connecting peripherals to the server 100. To the device connection interface 107, for example, a memory device 25 and a memory reader/writer 26 may be connected. The memory device 25 is a recording medium having a function for communicating with the device connection interface 107. The memory reader/writer 26 is a device for writing and reading data to and from a memory card 27. The memory card 27 is a card type recording medium.

The network interface 108 is connected to the network 20. Via the network 20, the network interface 108 transmits and receives data to and from different computers and communication devices.

The hardware configuration described above achieves the processing functions of the second embodiment. Note that the server 200 may be constructed with the same hardware configuration as the server 100. In addition, the information processing apparatus 10 of the first embodiment may also be constructed with the same hardware configuration as the server 100 of FIG. 5.

The server 100/200 achieves the processing functions of the second embodiment, for example, by implementing a program stored in a computer-readable recording medium. The program describing processing contents to be implemented by the server 100/200 may be stored in various types of recording media. For example, the program to be implemented by the server 100/200 may be stored in the HDD 103. The processor 101 loads at least part of the program stored in the HDD 103 into the memory 102 and then runs the program. In addition, the program to be implemented by the server 100/200 may be stored in a portable recording medium, such as the optical disk 24, the memory device 25, and the memory card 27. The program stored in the portable recording medium becomes executable after being installed on the HDD 103, for example, under the control of the processor 101. Alternatively, the processor 101 may run the program by directly reading it from the portable recording medium.

Figure 6:
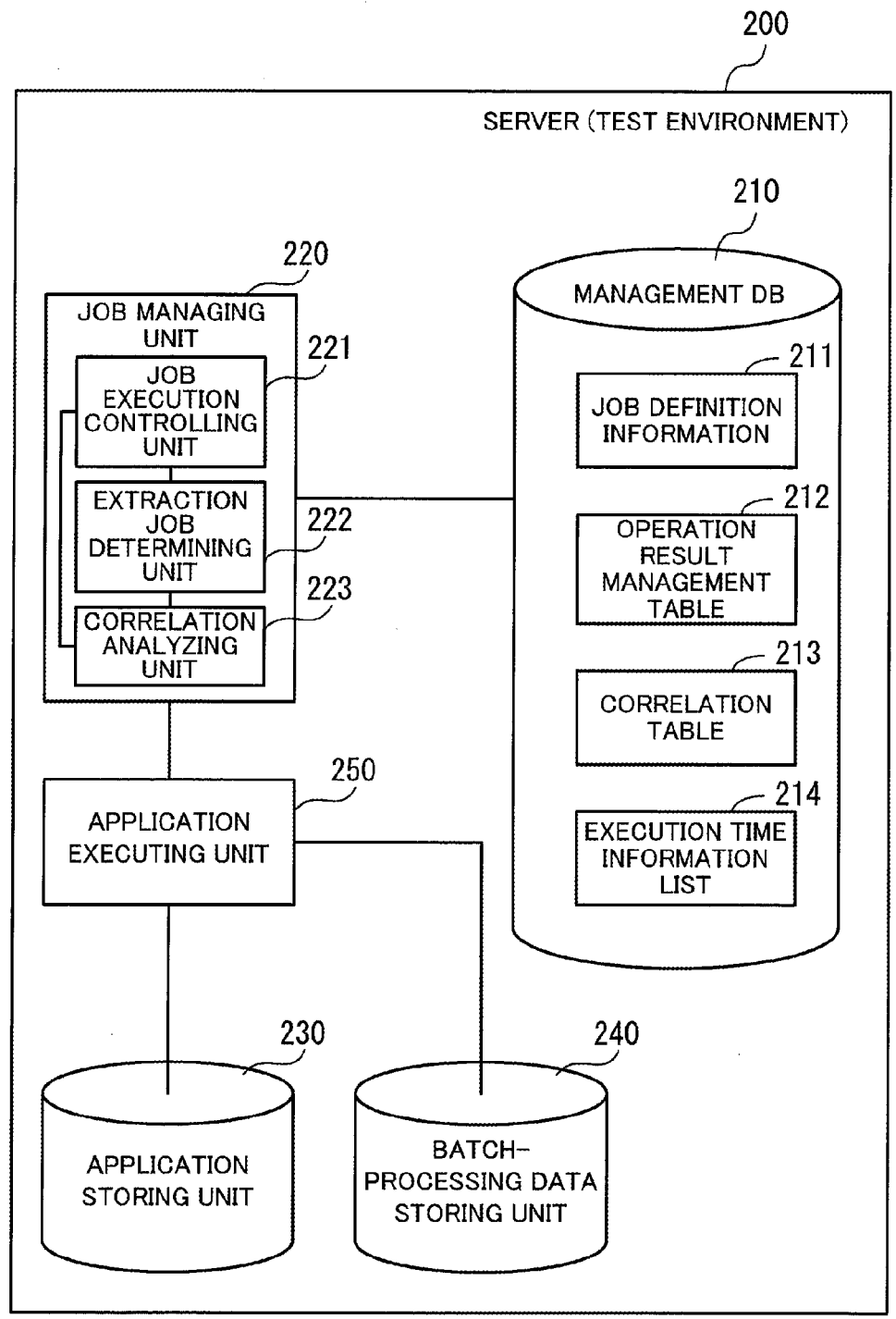
FIG. 6 is a block diagram illustrating functions of a server operating in a test environment.

Next described in detail is processing executed in the test environment server 200. FIG. 6 is a block diagram illustrating functions of a server operating in a test environment. The server 200 includes a management database (DB) 210, a job managing unit 220, an application storing unit 230, a batch-processing data storing unit 240, and an application executing unit 250.

The management database 210 stores therein information used for delay detection. A part of the storage area of the memory 102 or the HDD 103, for example, is used as the management database 210. The information stored in the management database 210 includes job definition information 211, an operation result management table 212, a correlation table 213, and an execution time information list 214.

The job definition information 211 is definition information about jobs executed in the batch processing. For example, information indicating whether each job is an extraction job is set in the job definition information 211. The operation result management table 212 is a data table in which operation results of jobs obtained in the test operation are registered. The registered operation results include, for example, the execution time, the size of an input file, and the size of an output file with respect to each job. The correlation table 213 is a data table indicating a combination of each extraction job and its correlative modification job. The execution time information list 214 is information indicating execution times of each job designated as a monitoring target job, obtained in the test operation.

The job managing unit 220 controls jobs during the batch-processing test operation. To do so, the job managing unit 220 includes a job execution controlling unit 221, an extraction job determining unit 222, and a correlation analyzing unit 223. The job execution controlling unit 221 instructs the application executing unit 250 to execute each job of the batch processing. The extraction job determining unit 222 determines extraction jobs from among jobs executed in the batch processing, based on operations of each job when the job is executed. The correlation analyzing unit 223 analyzes a correlation between each extraction job and a corresponding modification job based on the operation results of these jobs.

The application storing unit 230 stores therein a plurality of pieces of application software used to execute jobs. The application software here includes programs describing processing procedures and data used to execute processes according to the programs.

The batch-processing data storing unit 240 stores therein data used to execute the batch processing. The data stored in the batch-processing data unit 240 includes input files to be processed in the batch processing and extraction condition files in each of which conditions for extracting data from an input file are defined. In addition, data generated by executing jobs in the batch processing is also stored in the batch-processing data storing unit 240.

In response to an instruction from the job managing unit 220, the application executing unit 250 executes a job based on an application in the application storing unit 230. For example, the application executing unit 250 reads a file from the batch-processing data storing unit 240 and then executes a job using the file. Subsequently, the application executing unit 250 writes results obtained by executing the job to a file in the batch-processing data storing unit 240.

Figure 7:
FIG. 7 illustrates an example of job definition information.

Next described in detail is the data stored in the management database 210. FIG. 7 illustrates an example of job definition information. The job definition information 211 includes columns for job net name, job name, input file, output file, and extraction job flag. In the job net name column, each entry contains the name of a job net to which a corresponding job to be executed in the batch processing belongs. In the job name column, each entry contains the name of a corresponding job to be executed in the batch processing. In the input file column, each entry contains the identification information of a file to be used in the execution of a corresponding job. In the output file column, each entry contains the identification information of a file to which results obtained by executing a corresponding job are output. In the extraction job flag column, each entry contains a flag indicating whether a corresponding job is an extraction job (extraction job flag). If it is an extraction job, the extraction job flag is set to 'ON'. If not, the extraction job flag is set to 'OFF'.

FIG. 8 illustrates an example of an operation result management table. The operation result management table 212 includes columns for job net name, job name, execution time, input file, input file size, output file, and output file size. In the job net name column, each entry contains the name of a job net to which a corresponding job having been executed in the test operation belongs. In the job name column, each entry contains the name of a corresponding job having been executed in the test operation. In the execution time column, each entry contains the time period for the execution of a corresponding job. In the input file column, each entry contains the identification information of a file read during the execution of a corresponding job. In the input file size column, each entry contains the size (data amount) of a file read during the execution of a corresponding job. In the output file column, each entry contains the identification information of a file to which results obtained by executing a corresponding job have been output. In the output file size column, each entry contains the size (data amount) of a file to which the execution results of a corresponding job have been output.

Each time a job is executed, a record indicating operation results of the job is registered in the operation result management table 212. According to the example of FIG. 8, a job with a job name 'job001' has been executed three times and, therefore, three records of operation results are registered in the operation result management table 212.

The correlation table 213 is created based on the job definition information 211. When creating the correlation table 213, the correlation analyzing unit 223 acquires, from the job definition information 211, jobs whose extraction job flag is set to ON. The acquired jobs are regarded as extraction jobs. The correlation analyzing unit 223 searches for a different job whose entry under the column headed 'input file' is the same as an entry of each extraction job under the column headed 'output file' (referred to as the 'extraction file'). The found job is regarded as a modification job corresponding to the extraction job. Based on the search result, the correlation analyzing unit 223 creates the correlation table 213 as illustrated in FIG. 9.

Figure 9:
FIG. 9 illustrates an example of a correlation table.

FIG. 9 illustrates an example of a correlation table. The correlation table 213 includes columns for extraction job, extraction file, and modification job. The extraction job column includes sub-columns of job net name and job name. In the job net name sub-column, each entry contains the name of a job net to which a corresponding extraction job belongs. In the job name sub-column, each entry contains the name of a corresponding extraction job. In the extraction file column, each entry contains the identification information of a file in which data extracted by a corresponding extraction job is stored (extraction file). The modification job column includes sub-columns of job net name and job name. In the job net name sub-column, each entry contains the name of a job net to which a modification job using a corresponding extraction file as its input file belongs. In the job name sub-column, each entry contains the name of a corresponding modification job. The correlation table 213 configured in such a manner makes clear the execution order of each extraction job and its corresponding modification job.

FIG. 10 illustrates an example of an execution time information list. The execution time information list 214 includes columns for job net name, job name, average execution time, minimum execution time, and maximum execution time. In the job net name column, each entry contains the name of a job net to which a corresponding job having executed in the test operation belongs. In the job name column, each entry contains the name of a corresponding job having been executed in the test operation. In the average execution time column, each entry contains the average execution time period of a corresponding job. In the minimum execution time column, each entry contains the value indicating the minimum execution time period of a corresponding job. In the maximum execution time column, each entry contains the value indicating the maximum execution time period of a corresponding job.

The batch-processing test operation is performed by the server 200 having the above-described configuration. Various types of data are registered in the management database 210. The test operation is carried out, for example, in response to an input of information of batch processing including one or more job nets. In each job net, the following information is defined: the order of executing jobs; an application used to execute each job; and input and output files of each job.

Figure 11:
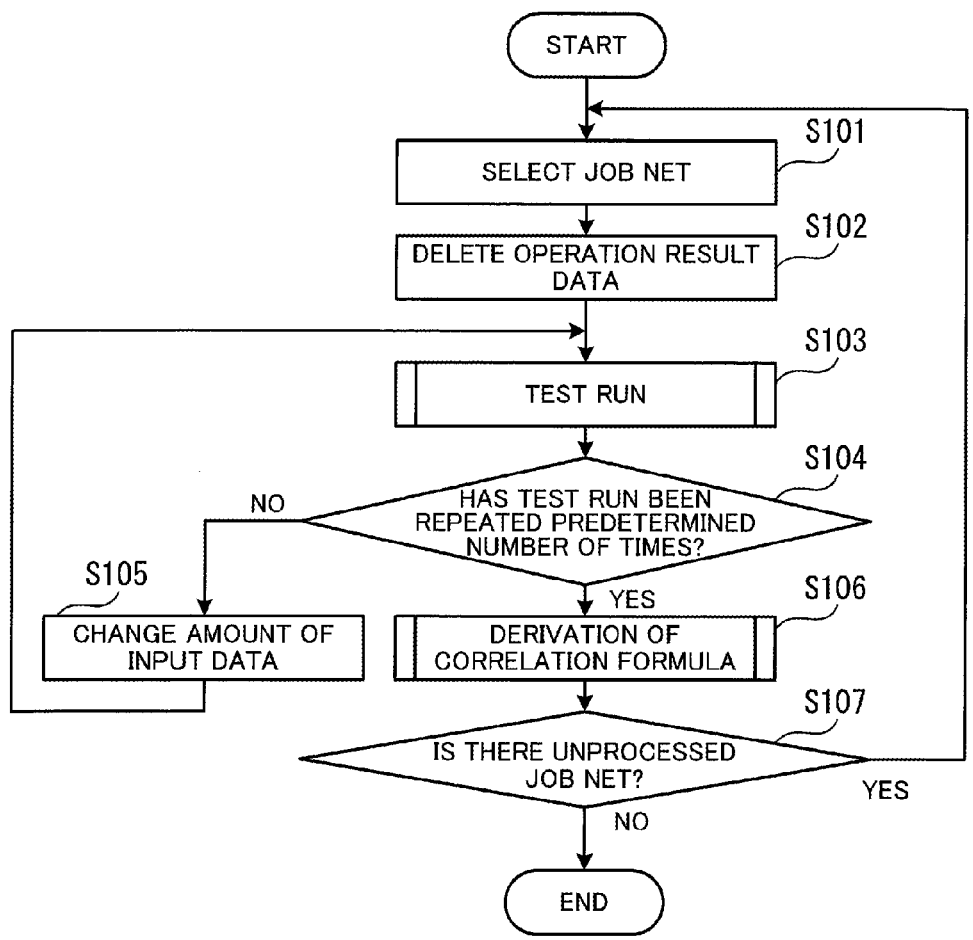
FIG. 11 is a flowchart illustrating an example of a processing procedure of the server for a test operation.

FIG. 11 is a flowchart illustrating an example of a processing procedure of a server for a test operation.

[Step S101] The job managing unit 220 selects one unprocessed job net from among job nets designated as batch processing.

[Step S102] The job managing unit 220 deletes operation result data from the operation result management table 212.

[Step S103] The job managing unit 220 starts a test run of the selected job net. By the execution of a batch-processing test, the job definition information 211 and the operation result management table 212 are created. The details of this process are described later (see FIGS. 14 to 20).

[Step S104] The job managing unit 220 determines whether the test run has been repeated a predetermined number of times. If the test run has been repeated the predetermined number of times, the procedure moves to step S106. If the test run has yet to be repeated the predetermined number of times, the procedure moves to step S105.

[Step S105] The job managing unit 220 changes the amount of input data and then advances the procedure to step S103. For example, the administrator preliminarily stores, in the server 200, a plurality of sets of input data each having a different data amount. Each time a test run ends, the job managing unit 220 changes the input data to a different set to run the test again.

[Step S106] The job managing unit 220 derives correlation formulae. The details of this process are described later (see FIG. 21).

[Step S107] The job managing unit 220 determines whether there is an unprocessed job net of the batch processing. If there is an unprocessed job net, the procedure moves to step S101. If all job nets have been treated, the procedure ends.

The following describes details of the process of each step illustrated in FIG. 11. A procedure during the test run is described first. During the batch-processing test run, jobs are actually started and sequentially executed based on individually designated applications. Then, a part of each processing request issued to the operating system during job execution is analyzed to automatically identify whether the job being executed is an extraction job.

How to determine an extraction job is described next in detail. Determination of an extraction job is made based on whether a job being executed has specifications or attributes of an extraction job. There are four attributes to be an extraction job as follows.

[Attribute a] In the execution of an extraction job, an entire input file is read record by record, or in fixed size blocks, sequentially from the beginning of the file to the end.

[Attribute b] In the execution of an extraction job, individual records whose value in a certain column satisfies an extraction condition designated by an extraction application are sequentially written to an output file record by record, or in fixed size blocks. On this occasion, no modification is made to the records.

[Attribute c] In the execution of an extraction job, data may be sorted into not one, but a plurality of output files according to extraction conditions. In the case where there are a plurality of output files, the relationship between the extraction conditions and the output files is defined in an extraction condition file.

[Attribute d] An extraction condition file is read in one go and then loaded into memory.

Figure 12:
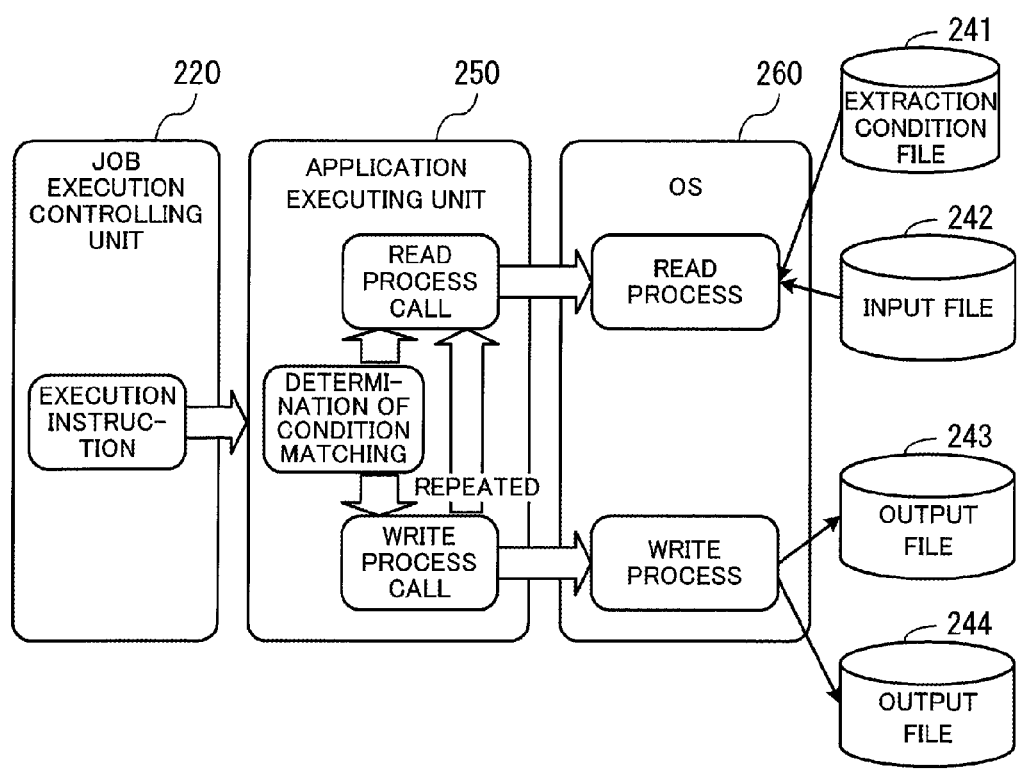
FIG. 12 illustrates an example of specifications/attributes of an extraction job.

FIG. 12 illustrates an example of specifications/attributes of an extraction job. The job execution controlling unit 221 outputs an instruction to execute an application designated in the batch processing. In response, the application executing unit 250 executes the designated application. For example, the application executing unit 250 reads a program of the application from the application storing unit 230 and executes processing according to the program.

If the application executed by the application executing unit 250 is an application in which processing content of an extraction job is defined, the application executing unit 250 first reads an extraction condition file 241 into memory. In this case, the application executing unit 250 makes a read process call designating the extraction condition file 241 to an operating system 260. In response to the call, the operating system 260 executes a process for reading the extraction condition file 241. The extraction condition file 241 read by the operating system 260 is stored in an area of the memory managed by the application executing unit 250.

The application executing unit 250 extracts data from an input file 242 according to extraction conditions defined in the extraction condition file 241. For example, the application executing unit 250 makes a read process call designating the input file 242 to the operating system 260. In response, the operating system 260 executes a process for reading data of the input file 242. The data read by the operating system 260 is stored in an area of the memory managed by the application executing unit 250.

With respect to each piece of the data of the input file 242 stored in the memory, the application executing unit 250 determines whether the data piece satisfies an extraction condition. If the data piece satisfies an extraction condition, the application executing unit 250 writes the data piece to an appropriate one of output files 243 and 244. For example, the application executing unit 250 makes a write process call designating one of the output files 243 and 244 to the operating system 260. In response, the operating system 260 executes a process for writing the data piece to the designated output file 243 or 244. The data piece reading and writing are repeated until all data pieces of the input file 242 are read.

The extraction job determining unit 222 monitors instructions from the application executing unit 250 to the operating system 260 during the processes illustrated in FIG. 12. For example, when a call event of data read or write is raised by the application executing unit 250, the extraction job determining unit 222 causes an interrupt (trap) to be executed in order to acquire content of the data read or write prior to the execution of a called function. The information acquired by the trap during the execution of a job is analyzed to determine whether the job being executed is an extraction job.

Figure 13:
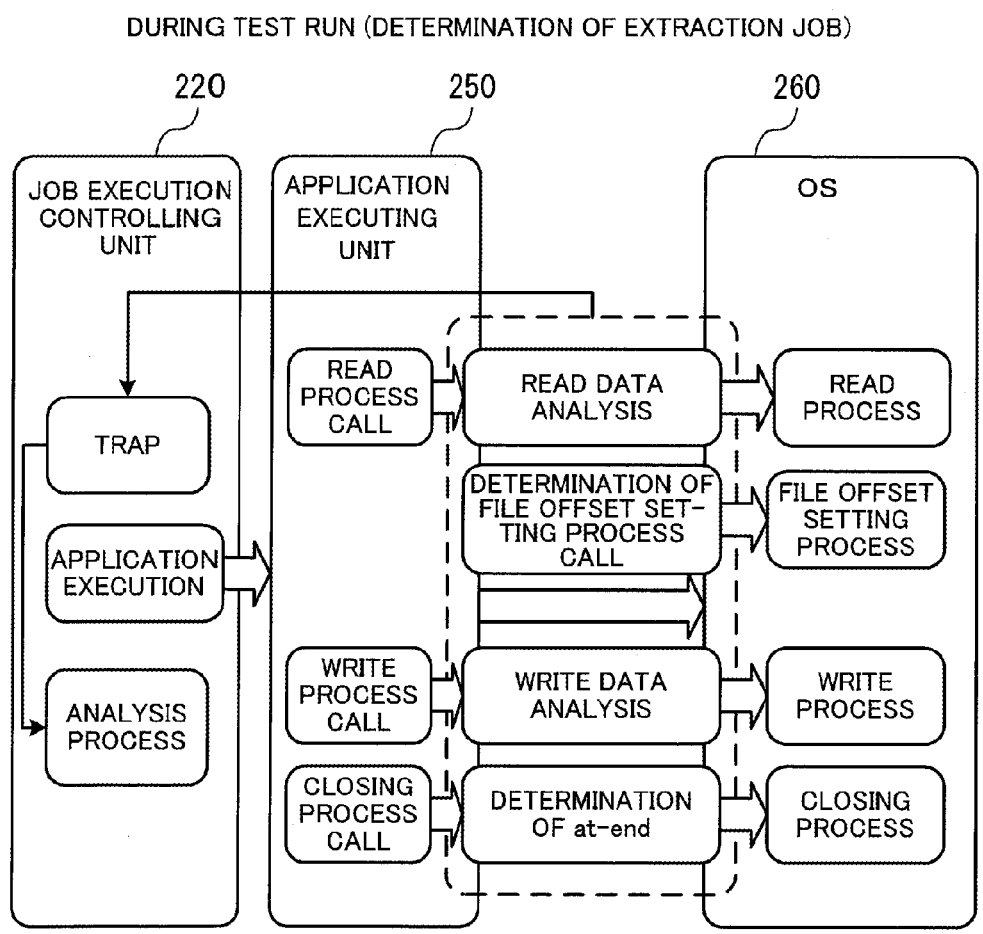
FIG. 13 illustrates a general outline of an extraction job determination process.

FIG. 13 illustrates a general outline of extraction job determination processes. For example, according to an instruction from the job execution controlling unit 221, the application executing unit 250 executes a job using an application. During the execution of the job, the application executing unit 250 may make a read process call, a write process call, or a closing process call to the operating system 260. When the application executing unit 250 makes such a process call to the operating system 260, information indicating content of the process is acquired by a trap caused by the extraction job determining unit 222.

Note that the operating system 260 executes a read process when a read process call is made, executes a write process when a write process call is made, and executes a closing process when a closing process call is made. The closing process is to place a file having been used into an unused state.

The extraction job determining unit 222 analyzes information acquired by a trap. For example, the extraction job determining unit 222 analyzes read data based on information of a read process call. The extraction job determining unit 222 analyzes write data based on information of a write process call. In addition, the extraction job determining unit 222 determines the presence or absence of 'at-end' based on information of a closing process call. Further, the extraction job determining unit 222 also determines the presence or absence of a file offset setting process call.

As described above, an extraction job has the four attributes, Attributes a to d. Whether a job has these attributes or not is determined as follows. As for Attributes a and d, a common determination process is used to determine whether the job has these attributes.

Determination Process for Attributes a/d

[Determination Process for Attributes a/d-1]

The extraction job determining unit 222 changes a shared library relationship in such a manner as to trap a read process, a file offset setting process, or a closing process implemented by an application executed as a job and cause data to be routed through a read analysis process. Subsequently, the extraction job determining unit 222 instructs the application executing unit 250 to execute the application. In response, the application executing unit 250 executes a job according to the application.

[Determination Process for Attributes a/d-2]

The extraction job determining unit 222 determines the type of a file (i.e., an input file or an extraction condition file) to be read in a read process. For example, the extraction job determining unit 222 determines whether the file is an input file or an extraction condition file based on the following criterion.

input file: data size designated for read process<size of file to be read extraction condition file: data size designated for read process≥size of file to be read That is, in the case of an input file, the file is large in size and is, therefore, read in a plurality of read processes. For this reason, when the data size designated for a read process is less than the size of a file to be read, the file to be read is determined as an input file. On the other hand, an extraction condition file is not very large in size and is, therefore, read in one read process. For this reason, when the data size designated for a read process is larger than or equal to the size of a file to be read, the file to be read is determined as an extraction condition file.

This determination process is used in combination with the 'determination process for Attribute c-1' to thereby determine an extraction job. Note that this 'determination process for Attributes a/d-2' may be omitted when it is known that an extraction job to be executed is to output results extracted from a single input file to a single output file, and is customized to designate a file name and an extraction condition (character strings) using parameters. On the other hand, in the case where an extraction job to be executed is to involve a plurality of extraction conditions and have output files each dedicated to one of the extraction conditions, it is common that definition information regarding the extraction conditions and names of the output files is passed to an application in the form of a file. When it is known that an extraction job to be executed is one involving a plurality of extraction conditions and output files, the execution of the 'determination process for Attributes a/d-2' improves the accuracy in the extraction job determination.

In the case of not executing the 'determination process for Attributes a/d-2', no differentiation is made between extraction condition files and input files. As a result, a job using an application for merging or sorting (but not modifying) data based on a plurality of input files may be mistakenly determined as an extraction job. Therefore, the execution of the 'determination process for Attributes a/d-2' prevents such wrong determination, thus improving the accuracy in the extraction job determination.

[Determination Process for Attributes a/d-3]

When a file offset setting process is called for an input file, it is considered that random access has taken place. In this case, therefore, the extraction job determining unit 222 determines that an application used by the job is not an extraction application. The 'determination process for Attributes a/d-3' directly determines whether an application to be determined is an extraction application. The execution of the 'determination process for Attributes a/d-3' improves the accuracy in the extraction job determination.

In the case of not executing the 'determination process for Attributes a/d-3', it is not determined whether all records of an input file are sequentially read or only partial records of an input file are read. As a result, a job for implementing merging or sorting using, as its input file, a modified data file including a plurality of types of records may be mistakenly determined as an extraction job. The file including a plurality of types of records has a structure in which different types of records A and records B are present, and a plurality of records B belong to one record A, which points to each of the plurality of records B. In a job using such a file as its input file, while the records A are being read until End-Of-File (EOF) of the file is reached, a process is performed only on records B containing needed information amongst the plurality of records B pointed by each record A. In this case, because the reading has been carried out to EOF, simply determining whether the input file has been read to the end is not enough to correctly determine whether the job is an extraction job. Therefore, the execution of the 'determination process for Attributes a/d-3' prevents such wrong determination, thus improving the accuracy in the extraction job determination.

[Determination Process for Attributes a/d-4]

In the case where reading is ended in the middle of an input file (i.e., 'at-end' is not detected in the read process), the extraction job determining unit 222 determines that the job is not an extraction job. The 'determination process for Attributes a/d-4' directly determines whether the job being executed is an extraction job.

In the case of not executing the 'determination process for Attributes a/d-4', it is not determined whether the input file has been processed to the end. As a result, a job of sequentially reading records of an input file from the beginning and then ending the reading after obtaining one record serving a purpose may be mistakenly determined as an extraction job. An example of such a job (i.e., a job ending the reading after taking out only one record from an input file) is a job of obtaining appropriate data using, as a keyword, a unique identification number assigned to business data, such as an order number and a slip number. A job of this kind always obtains only one set of data and, therefore, a subsequent job of modifying the obtained data has little influence on the entire processing time. Therefore, it is appropriate that a job of ending the reading after obtaining only one set of information from an input file is not determined as an extraction job in terms of job delay detection.

Determination Process for Attribute b

[Determination Process for Attribute b-1]

The extraction job determining unit 222 changes a shared library relationship in such a manner as to trap a write process or a file offset setting process implemented by an application executed as a job and cause data to be routed through a write analysis process. Subsequently, the extraction job determining unit 222 instructs the application executing unit 250 to execute the application. In response, the application executing unit 250 executes the job according to the application. Note that the same process is performed in the 'determination process for Attributes a/d-1', and is omitted if the 'determination process for Attributes a/d-1' is already carried out.

[Determination Process for Attribute b-2]

Until a write process is called, the extraction job determining unit 222 holds, in memory, data of the input file read in the 'determination process for Attributes a/d'. Then, when the write process is called, the extraction job determining unit 222 divides write data into records (for example, by using a linefeed code as a record separator). Subsequently, the extraction job determining unit 222 determines whether, in the data held in the memory, there is data exactly identical to the data divided into records. If there is no such data, the extraction job determining unit 222 determines that the job is not an extraction job. The 'determination process for Attribute b-2' directly determines whether the job being executed is an extraction job.

In the case of not executing the 'determination process for Attribute b-2', it is not determined whether the input data has undergone a modification process. For example, there is a job of sequentially reading records of its input file from the beginning, then performing a modification process, such as compilation and data conversion, on the records, and sequentially writing the modified records to an output file. Without the execution of the 'determination process for Attribute b-2', such s job may be mistakenly determined as an extraction job. Therefore, the execution of the 'determination process for Attribute b-2' prevents such wrong determination, thus improving the accuracy in the extraction job determination.

[Determination Process for Attribute b-3]

When a file offset setting process is called for an output file, it is considered that random access has taken place. In this case, therefore, the extraction job determining unit 222 determines that the job is not an extraction job. The 'determination process for Attribute b-3' directly determines whether a determination target job is an extraction job.

In the case of not executing the 'determination process for Attribute b-3', it is not determined whether individual records are sequentially written to an output file record by record. For example, there is a job of sequentially reading records of its input file from the beginning, then writing only a specific data item (column) to an output file, and overwriting a record already output to the output file when detecting a corrected record in the input file. Without the execution of the 'determination process for Attribute b-3', such a job may be mistakenly determined as an extraction job. Therefore, the execution of the 'determination process for Attribute b-3' improves the accuracy in the extraction job determination.

Determination Process for Attribute c

As for a file determined as an extraction condition file in the 'determination process for Attributes a/d', the extraction job determining unit 222 determines whether data read in the read process includes names of files designated for the write process. If the read data includes no file name for the write process, the extraction job determining unit 222 determines that a job being executed is not an extraction job. This process is used in combination with the 'determination process for Attributes a/d-2' to thereby determine an extraction job.

The above has described the processes for determining an extraction job based on Attributes a to d. When the job being executed is not determined as a 'non-extraction job' in all the determination processes, the extraction job determining unit 222 determines the job as an extraction job, and indicates in the job definition information 211 (see FIG. 7) that the job is an extraction job. For example, the determining unit 222 sets the extraction job flag of each job determined as an extraction job to ON and sets the extraction job flags of the remaining jobs to OFF.

In the above described manner, each job executed in the test operation is determined to be an extraction job or not. Note that it is possible to determine whether it is an extraction job by not executing all the determination processes described above. Nonetheless, higher determination accuracy is achieved by carrying out more determination processes.

The correlation analyzing unit 223 records the execution time, the input file size, and the output file size with respect to each job in the operation result management table 212, in parallel with the processes of the extraction job determining unit 222 to determine whether the job is an extraction job. Each of the information items is recorded at the following timing.

input file size: at the start of the job output file size: at the end of the job execution time: at the end of the job A plurality of test runs are carried out, for example, under different conditions. For example, a stress test (performance test) with a large volume of data is carried out. As many sets of operation result data as the number of test runs carried out are recorded in the operation result management table 212. If three test runs have been carried out, three sets of operation result data are recorded for one job in the operation result management table 212, as illustrated in FIG. 8.

Note that, at the start of each job, the correlation analyzing unit 223 always checks whether an application to be executed has been updated. If the application has been updated, the correlation analyzing unit 223 clears, from the operation result management table 212, operation result data of a job having been previously executed using the application. This prevents generation of a mixture of operation result data sets obtained when a plurality of versions of the same application have been executed. Note that whether an application has been updated is determined, for example, based on whether a change has been made to the date, size, or fingerprint (FP) of an executable file of the application. The fingerprint is data used to verify that information has not been altered, and a hash value obtained by applying a hash function to a program is an example of such a fingerprint.

Next described is a test run processing procedure with reference to FIGS. 14 to 19. Note that job nets of the batch processing (including information of an application used to execute each job) are input to the job execution controlling unit 221 prior to the test run.

Figure 14:
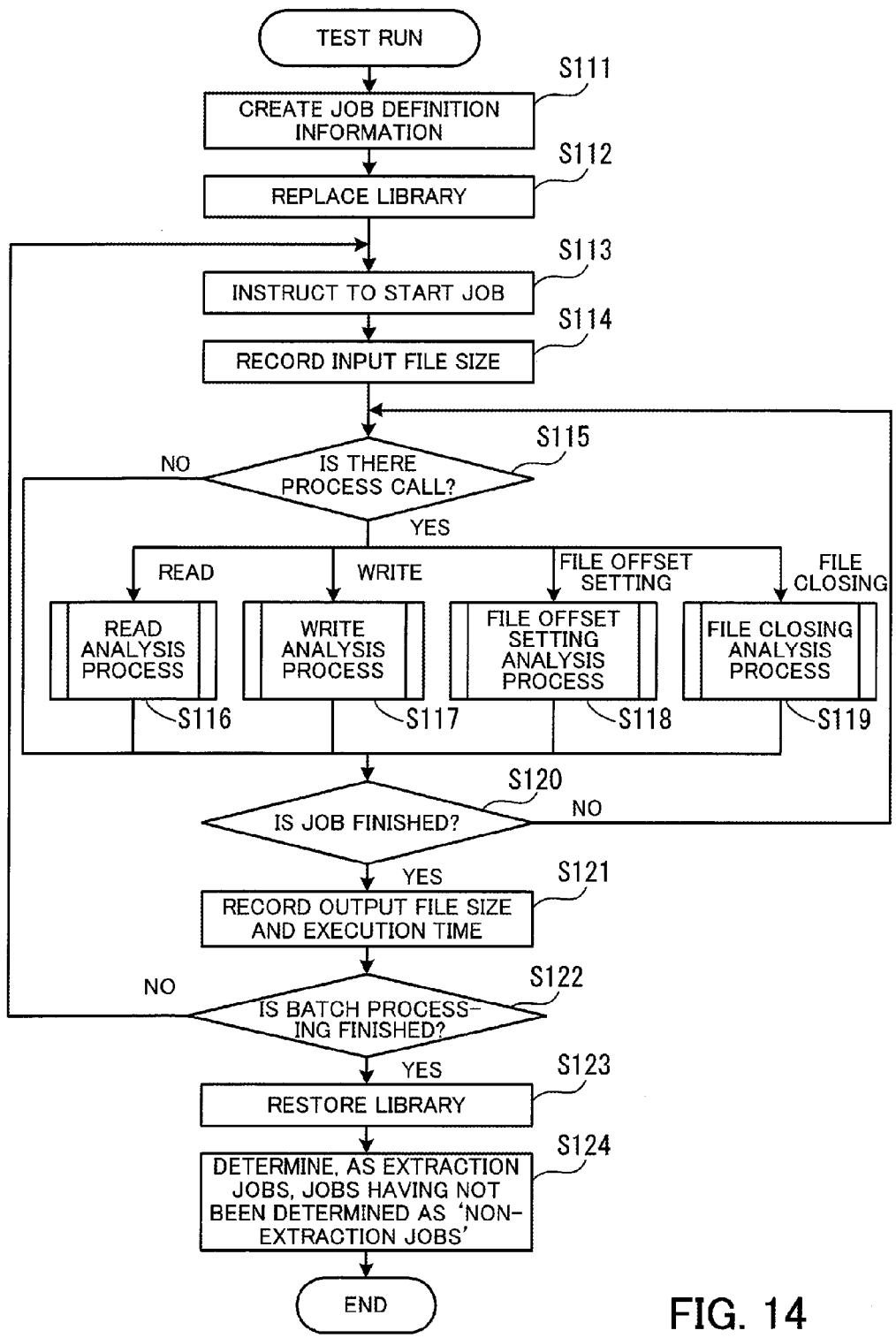
FIG. 14 is a flowchart illustrating an example of a test run processing procedure.

FIG. 14 is a flowchart illustrating an example of a test run processing procedure.

[Step S111] The job execution controlling unit 221 creates the job definition information 211. For example, based on information of the job nets indicating content of the batch processing, the job execution controlling unit 221 extracts the job name, input file, and output file of each job included in the job nets to thereby create the job definition information 211. The job execution controlling unit 221 stores the created job definition information 211 in the management database 210.

[Step S112] The extraction job determining unit 222 replaces a library for process calls to the operating system 260 with a library with a trap function.

[Step S113] The job execution controlling unit 221 instructs the application executing unit 250 to start execution of a subsequent job according to the execution order indicated by the job nets. In response, using an application corresponding to a job to be executed, the application executing unit 250 starts the execution of the job.

[Step S114] The correlation analyzing unit 223 records, in the operation result management table 212, the input file size of the job started by the application executing unit 250. For example, the correlation analyzing unit 223 registers the job net name, job name, input file (identification information of the input file), and input file size of the job in the operation result management table 212 as a new record.

[Step S115] The extraction job determining unit 222 determines whether there is a process call from the application executing unit 250 to the operating system 260. If there is a process call, the extraction job determining unit 222 determines the called process. In the case where a read process is called, the procedure moves to step S116. In the case where a write process is called, the procedure moves to step S117. In the case where a file offset setting process is called, the procedure moves to step S118. In the case where a file closing process is called, the procedure moves to step S119. If there is no process call, the procedure moves to step S120. Note that if there is a call to a process other than the read process, write process, file offset setting process, and file closing process, the procedure moves to step S120 as in the case where there is no process call.

Figure 16:
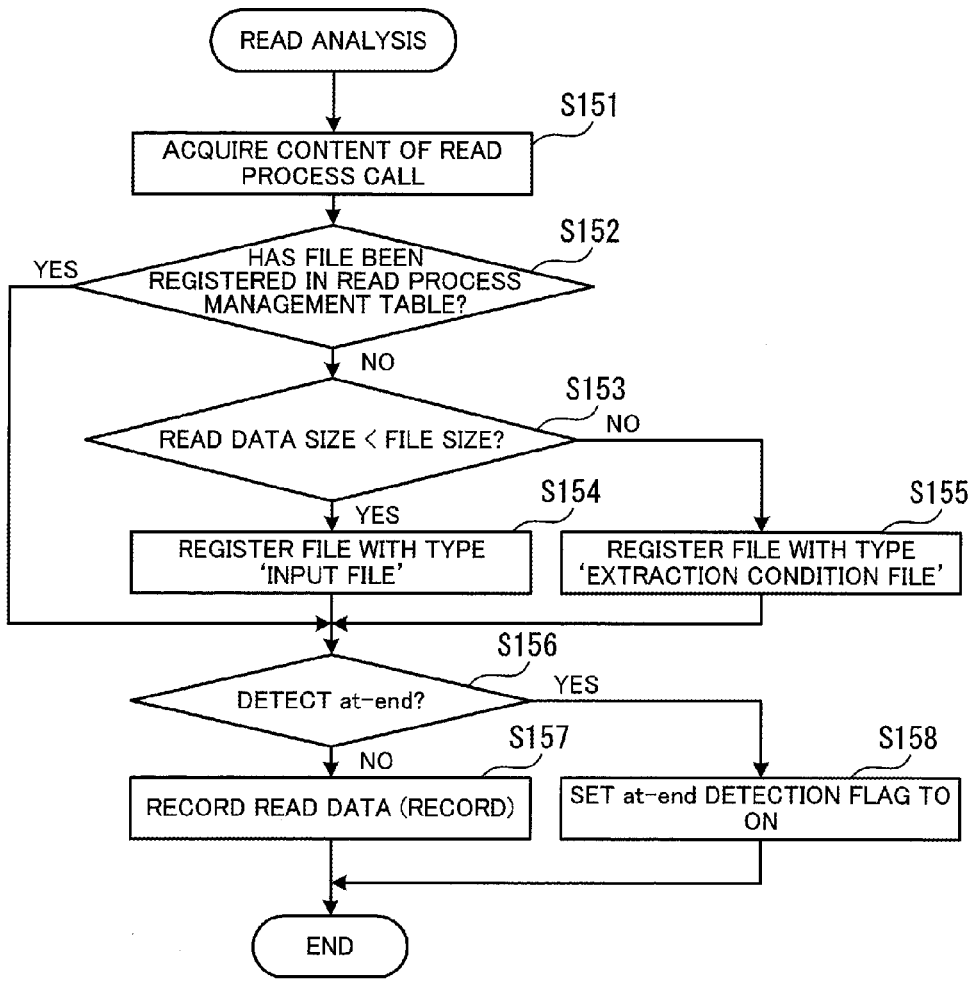
FIG. 16 is a flowchart illustrating an example of a procedure of a read analysis process.

[Step S116] The extraction job determining unit 222 executes a read analysis process, the details of which are described later (see FIG. 16). When the read analysis process is finished, the procedure moves to step S120.

Figure 18:
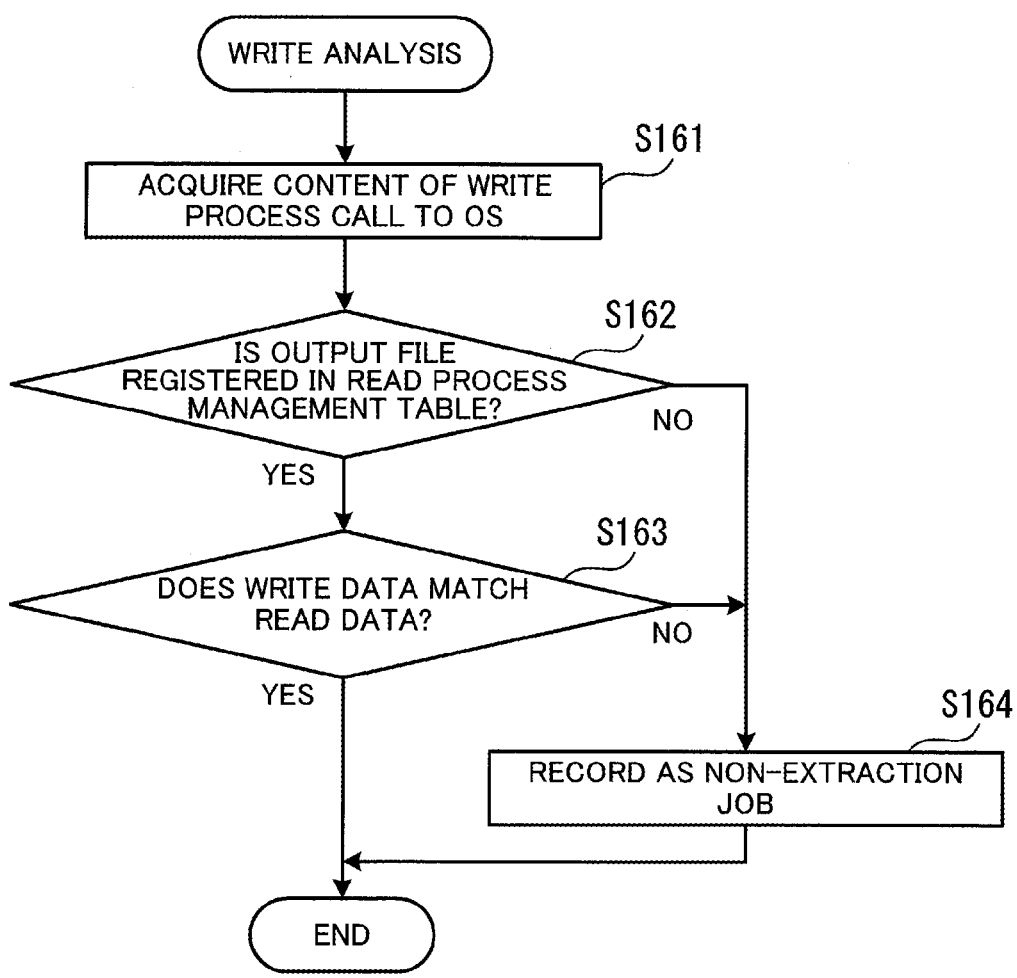
FIG. 18 is a flowchart illustrating an example of a procedure of a write analysis process.

[Step S117] The extraction job determining unit 222 executes a write analysis process, the details of which are described later (see FIG. 18). When the write analysis process is finished, the procedure moves to step S120.

Figure 19:
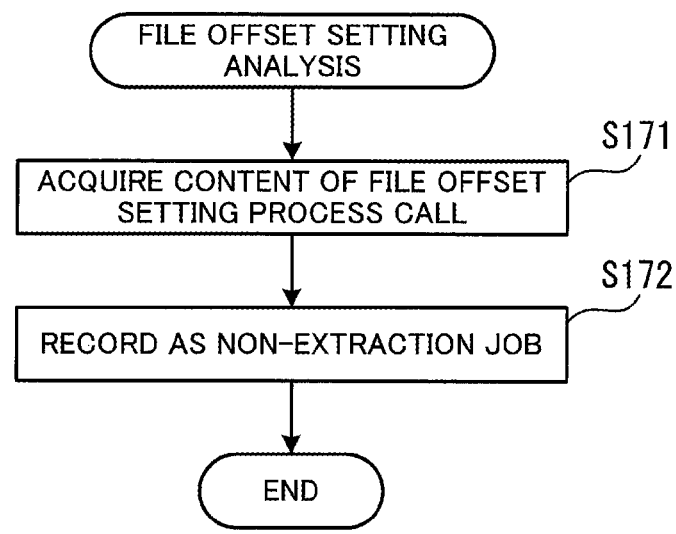
FIG. 19 is a flowchart illustrating an example of a procedure of a file offset setting analysis process.

[Step S118] The extraction job determining unit 222 executes a file offset setting analysis process, the details of which are described later (see FIG. 19). When the file offset setting analysis process is finished, the procedure moves to step S120.

Figure 20:
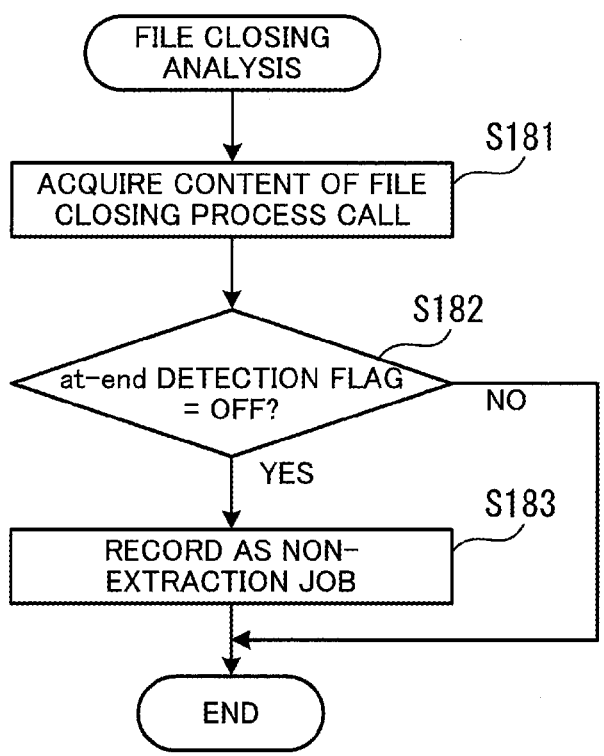
FIG. 20 is a flowchart illustrating an example of a procedure of a file closing analysis process.

[Step S119] The extraction job determining unit 222 executes a file closing analysis process, the details of which are described later (see FIG. 20). When the file closing analysis process is finished, the procedure moves to step S120.

[Step S120] The job execution controlling unit 221 determines whether the job being executed is finished. If the job is finished, the procedure moves to step S121. If the job is yet to be finished, the procedure moves to step S115.

[Step S121] When the execution of the job is finished, the correlation analyzing unit 223 records the output file size and the execution time of the finished job in the operation result management table 212. For example, the correlation analyzing unit 223 adds information including the output file (identification information of the output file), output file size, and execution time to a corresponding record registered in the operation result management table 212 in step S114.

[Step S122] The job execution controlling unit 221 determines whether the batch processing is finished. If the batch processing is finished, the procedure moves to step S123. If the batch processing is not finished, the procedure moves to step S113 in which the job execution controlling unit 221 instructs the application executing unit 250 to start execution of a subsequent job in the job nets.

[Step S123] The extraction job determining unit 222 restores the library replaced in step S112.

[Step S124] The extraction job determining unit 222 determines that jobs having not been determined as 'non-extraction jobs' are extraction jobs, and indicates so in the job definition information 211. For example, in the job definition information 211, the extraction job determining unit 222 sets the extraction job flag of each job determined as an extraction job to ON. Then, as for jobs whose extraction job flag has not been set, the extraction job determining unit 222 sets the extraction job flag to OFF.

In the above-described manner, the extraction job determination and the operation result collection in the test run are achieved. Next described is a standard processing procedure that takes place when a job executed in the test run is an extraction job.

Figure 15:
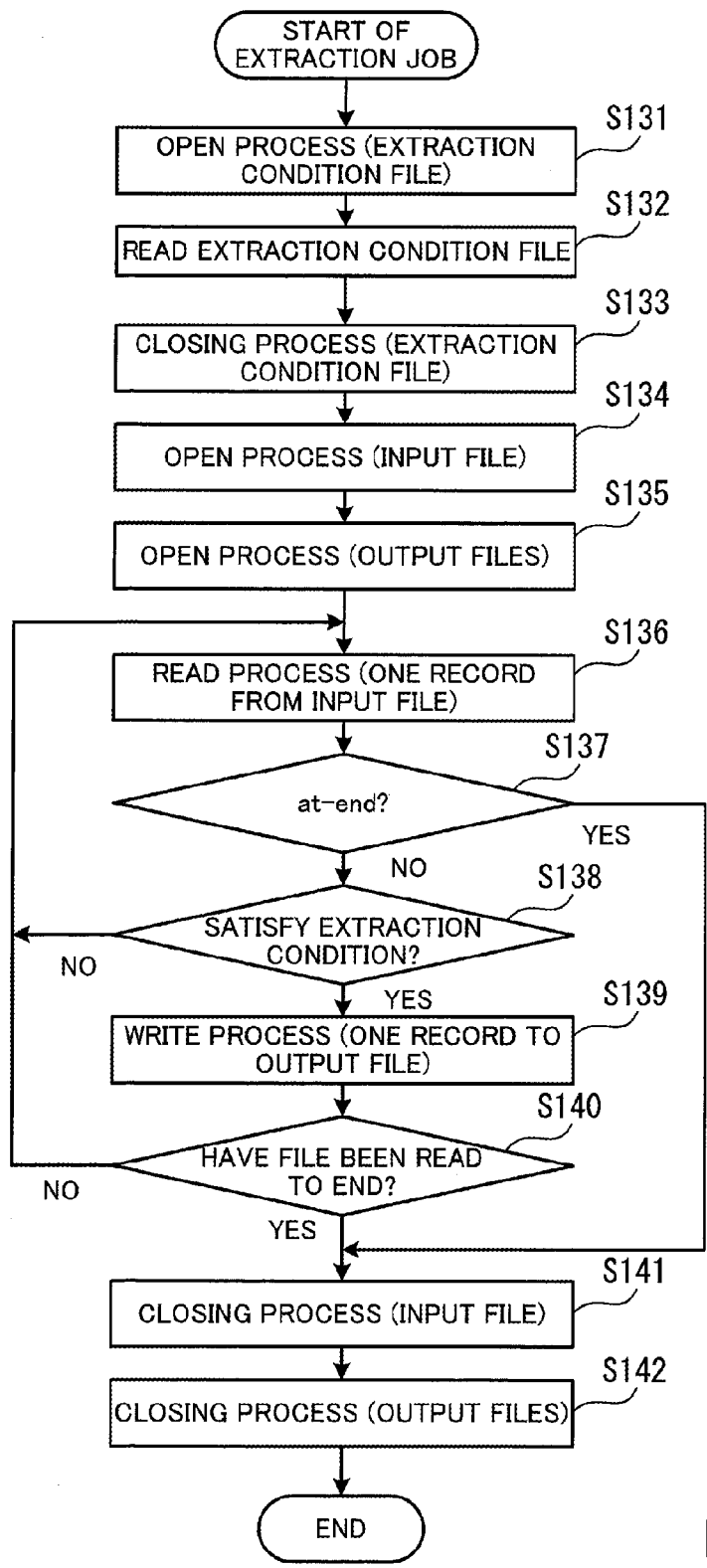
FIG. 15 is a flowchart illustrating an example of an extraction job processing procedure.

FIG. 15 is a flowchart illustrating an example of an extraction job processing procedure. Note that the following procedure is executed by the application executing unit 250 based on an application which describes processing content of the extraction job.

[Step S131] The application executing unit 250 performs a process for opening the extraction condition file 241 of a job to be executed. For example, the application executing unit 250 makes an open process call designating the extraction condition file 241 to the operating system 260. In response to the open process call, the operating system 260 allows the application executing unit 250 to access the extraction condition file 241, which is brought into the in-use state.

[Step S132] The application executing unit 250 performs a process for reading the extraction condition file 241. For example, the application executing unit 250 stores, in memory, extraction conditions defined in the extraction condition file 241 stored in the HDD.

[Step S133] The application executing unit 250 performs a process for closing the extraction condition file 241. For example, the application executing unit 250 makes a closing process call designating the extraction condition file 241 to the operating system 260. In response to the closing process call, the operating system 260 puts the extraction condition file 241 into non-use.

[Step S134] The application executing unit 250 performs a process for opening the input file 242 of the job to be executed. For example, the application executing unit 250 makes an open process call designating the input file 242 to the operating system 260. In response to the open process call, the operating system 260 allows the application executing unit 250 to access the input file 242, which is brought into the in-use state.

[Step S135] The application executing unit 250 performs a process for opening the output files 243 and 244 of the job to be executed. For example, the application executing unit 250 makes an open process call designating the output files 243 and 244 to the operating system 260. In response to the open process call, the operating system 260 allows the application executing unit 250 to access the output files 243 and 244, which are brought into the in-use state.

[Step S136] The application executing unit 250 sequentially reads one record from the input file 242, starting from the beginning.

[Step S137] The application executing unit 250 determines whether the read record is an identifier indicating the end of the file (for example, 'at-end'). If the read record is an identifier indicating the end of the file, the procedure moves to step S141. If not, the procedure moves to step S138.

[Step S138] The application executing unit 250 determines whether the read record satisfies one of the extraction conditions read in step S132. If the read record satisfies one of the extraction conditions, the procedure moves to step S139. If not, the procedure moves to step S136.

[Step S139] The application executing unit 250 writes the read record to an appropriate one of the output files 243 and 244.

[Step S140] The application executing unit 250 determines whether to have read the input file 242 to the end. If the application executing unit 250 has read the input file 242 to the end, the procedure moves to step S141. If not, the procedure moves to step S136.

[Step S141] The application executing unit 250 performs a process for closing the input file 242. For example, the application executing unit 250 makes a closing process call designating the input file 242 to the operating system 260. In response to the closing process call, the operating system 260 puts the input file 242 into non-use.

[Step S142] The application executing unit 250 performs a process for closing the output files 243 and 244. For example, the application executing unit 250 makes a closing process call designating the output files 243 and 244 to the operating system 260. In response to the closing process call, the operating system 260 puts the output files 243 and 244 into non-use.

Based on whether the procedure of FIG. 15 has taken place, the extraction job determining unit 222 determines whether an executed job is an extraction job.

When the extraction condition file 241 and the input file 242 are read in steps S132 and S136, respectively, of FIG. 15, the following procedure is performed by the extraction job determining unit 222. FIG. 16 is a flowchart illustrating an example of a procedure of a read analysis process.

[Step S151] The extraction job determining unit 222 acquires content of the read process call made by the application executing unit 250 to the operating system 260.

[Step S152] The extraction job determining unit 222 determines whether a file designated as a read process target is registered in a read process management table. The read process management table is a data table for managing content of file read processes. The read process management table is generated by the extraction job determining unit 222 and then stored in memory.

Figure 17:
FIG. 17 illustrates an example of a read process management table.

FIG. 17 illustrates an example of a read process management table. A read process management table 224 includes columns for file, type, and read data. In the file column, each entry contains the identification information (for example, directory name and file name) of a read file. In the type column, each entry contains the type of a read file. The types of files include input file and extraction condition file. In the read data column, each entry contains data included in a read file. In the case where an extraction condition file is read, extraction conditions and identification information (directory name and file name) of output files are registered in a corresponding entry of the read data column.

Referring back to FIG. 16, if the read process target file is determined to be registered in the read process management table 224 in step S152, the procedure moves to step S156. If not, the procedure moves to step S153.

[Step S153] The extraction job determining unit 222 determines whether the data size designated for the read process is less than the size of the read target file (file size). If the designated data size is less than the file size, the procedure moves to step S154. If the designated data size is larger than or equal to the file size, the procedure moves to step S155.

[Step S154] When the data size designated for the read process is less than the file size, the extraction job determining unit 222 registers, in the read process management table 224, a new record with the type of the read file being 'input file'. Subsequently, the procedure moves to step S156.

[Step S155] When the data size designated for the read process is larger than or equal to the file size, the extraction job determining unit 222 registers, in the read process management table 224, a new record with the type of the read file being 'extraction condition file'.

[Step S156] The extraction job determining unit 222 determines whether an identifier indicating the end of the file (for example, 'at-end') is detected in the data included in the file read by the operating system 260. If the identifier indicating the end of the file is detected, the procedure moves to step S158. If not, the procedure moves to step S157.

[Step S157] When the identifier indicating the end of the file is not included in the read data, the extraction job determining unit 222 registers the read data (record) in the read process management table 224. Subsequently, the read analysis process ends.

[Step S158] When the identifier indicating the end of the file is included in the read data, the extraction job determining unit 222 sets an at-end detection flag of the file to ON. Note that the default setting of the at-end detection flag is OFF. Subsequently, the read analysis process ends.

The write analysis process is described next in detail. FIG. 18 is a flowchart illustrating an example of a procedure of a write analysis process.

[Step S161] The extraction job determining unit 222 acquires content of the write process call made by the application executing unit 250 to the operating system 260.

[Step S162] The extraction job determining unit 222 determines whether a file designated as a write process target is registered in the read process management table 224. If the write process target file is registered in the read process management table 224, the procedure moves to step S163. If not, the procedure moves to step S164.

[Step S163] The extraction job determining unit 222 determines whether write data matches read data. For example, the extraction job determining unit 222 compares write target data of the write process call with data registered in the read process management table 224 in association with the write target file. If the data matches each other, the extraction job determining unit 222 determines that the write data matches the read data. If the write data matches the read data, the write analysis process ends. If the write data does not match the read data, the procedure moves to step S164.

[Step S164] When the write data does not match the read data, the extraction job determining unit 222 records the job currently executed as being not an extraction job (non-extraction job). For example, the extraction job determining unit 222 sets, in the job definition information 211, the extraction job flag of the currently executed job to OFF indicating that the job is not an extraction job. Subsequently, the write analysis process ends.

The file offset setting analysis process is described next in detail. FIG. 19 is a flowchart illustrating an example of a procedure of a file offset setting analysis process.

[Step S171] The extraction job determining unit 222 acquires content of the file offset setting process call made by the application executing unit 250 to the operating system 260.

[Step S172] The extraction job determining unit 222 records the job currently executed as being not an extraction job (non-extraction job). For example, the extraction job determining unit 222 sets, in the job definition information 211, the extraction job flag of the currently executed job to OFF indicating that the job is not an extraction job. Subsequently, the file offset setting analysis process ends.

The file closing analysis process is described next in detail. FIG. 20 is a flowchart illustrating an example of a procedure of a file closing analysis process.

[Step S181] The extraction job determining unit 222 acquires content of the file closing process call made by the application executing unit 250 to the operating system 260.

[Step S182] The extraction job determining unit 222 determines whether the at-end detection flag of the currently executed job is set to OFF. If the at-end detection flag is set to OFF, the procedure moves to step S183. If the at-end detection flag is set to ON, the file closing analysis process ends.

[Step S183] When the at-end detection flag is set to OFF, the extraction job determining unit 222 records the currently executed job as being not an extraction job (non-extraction job). For example, the extraction job determining unit 222 sets, in the job definition information 211, the extraction job flag of the currently executed job to OFF indicating that the job is not an extraction job. Subsequently, the file closing analysis process ends.

In the above-described manner, with respect to each job executed during the test operation, the judgment of being an extraction job or not is made and the operation result data is recorded. Based on the result of the extraction job determination and the operation result data, the correlation analyzing unit 223 analyzes the correlation between each extraction job and a corresponding modification job to thereby derive a correlation formula.

Figure 21:
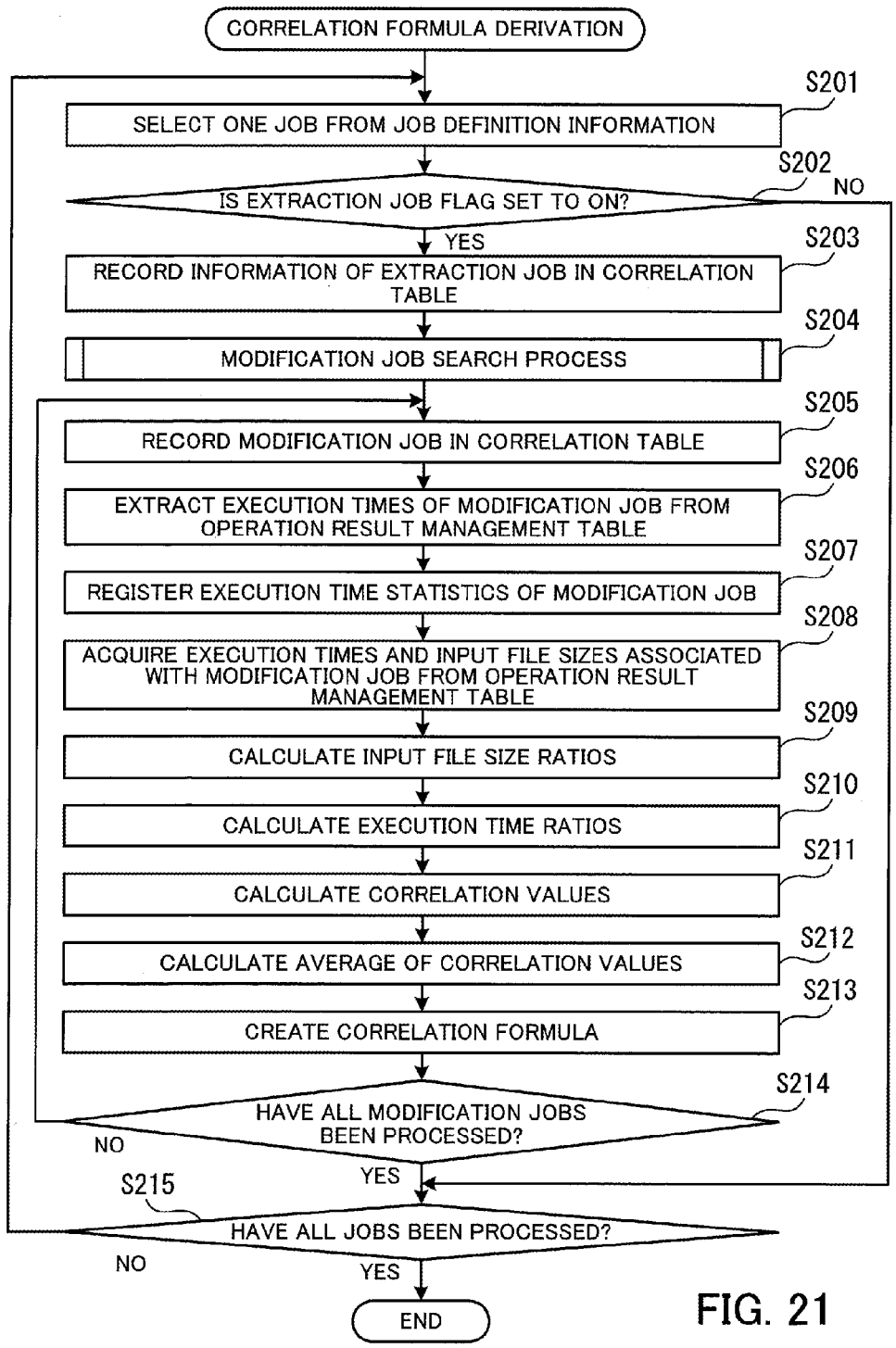
FIG. 21 is a flowchart illustrating an example of a procedure of a correlation formula derivation process.

FIG. 21 is a flowchart illustrating an example of a procedure of a correlation formula derivation process.

[Step S201] The correlation analyzing unit 223 selects one non-selected job from the job definition information 211.

[Step S202] The correlation analyzing unit 223 determines whether the extraction job flag of the selected job is set to ON. If the extraction job flag is set to ON, the procedure moves to step S203. If the extraction job flag is set to OFF, the procedure moves to step S215.

[Step S203] When the extraction job flag is set to ON, the correlation analyzing unit 223 determines that the selected job is an extraction job and then stores information of the extraction job in the correlation table 213. For example, the correlation analyzing unit 223 acquires, from the job definition information 211, the job net name and job name of the extraction job, which are then registered in the correlation table 213. Further, the correlation analyzing unit 223 acquires, from the job definition information 211, identification information of the output file of the extraction job, which is then registered in the correlation table 213 as an extraction file of the extraction job.

[Step S204] The correlation analyzing unit 223 executes a process for searching modification jobs corresponding to the selected job (extraction job). By the searching process, one or more modification jobs are detected. Details of the process are descried later (see FIG. 24).

[Step S205] The correlation analyzing unit 223 records, in the correlation table 213, one unprocessed modification job amongst the modification jobs detected in step S204. For example, the correlation analyzing unit 223 acquires, from the job definition information 211, the job net name and job name of the modification job, which are then registered in the correlation table 213 in association with the selected job (extraction job).

[Step S206] The correlation analyzing unit 223 extracts, from the operation result management table 212, the execution times of the modification job recorded in the correlation table 213 in step S205.

[Step S207] The correlation analyzing unit 223 registers statistics of the execution times of the modification job in the execution time information list 214. For example, based on the operation result management table 212, the correlation analyzing unit 223 obtains the average execution time, the minimum execution time, and the maximum execution time of the modification job. The average execution time is obtained by dividing the sum of the execution times by the number of test runs. The minimum execution time has the smallest value among all the execution times of the modification job. On the other hand, the maximum execution time has the largest value among all the execution times of the modification job. Then, the correlation analyzing unit 223 registers, in the execution time information list 214, a set of the job net name, job name, average execution time, minimum execution time, and maximum execution time of the modification job as a new record.

[Step S208] The correlation analyzing unit 223 acquires, from the operation result management table 212, sets of the execution time and the input file size of all the records associated with the modification job.

[Step S209] The correlation analyzing unit 223 obtains input file size ratios of the modification job. For example, the correlation analyzing unit 223 uses, among the input file sizes indicated in the operation result records associated with the modification job, the smallest input file size as a base file size. Then, for each of the input file sizes in the operation result records associated with the modification job, the correlation analyzing unit 223 calculates an input file size ratio by dividing the input file size by the base file size. The correlation analyzing unit 223 registers the calculated input file size ratios in the operation result management table 212.

[Step S210] The correlation analyzing unit 223 obtains execution time ratios of the modification job. For example, the correlation analyzing unit 223 uses, among the execution times in the operation result records associated with the modification job, the minimum execution time as a base execution time. Then, for each of the execution times in the operation result records associated with the modification job, the correlation analyzing unit 223 calculates an execution time ratio by dividing the execution time by the base execution time. The correlation analyzing unit 223 registers the calculated execution time ratios in the operation result management table 212.

[Step S211] The correlation analyzing unit 223 obtains correlation values. For example, for each of the operation result records associated with the modification job, the correlation analyzing unit 223 calculates a correlation value between the input file size ratio and the execution time ratio of the operation result record by dividing the execution time ratio by the input file size ratio. Then, the correlation analyzing unit 223 registers the calculated correlation values in the operation result management table 212. Each of the correlation values represents the increment of the execution time in relation to the increment of the input file size.

[Step S212] The correlation analyzing unit 223 calculates the average of the correlation values of the modification job. Then, the correlation analyzing unit 223 registers the average correlation value in the operation result management table 212.

By steps S209 to S212, the operation result management table 212 is updated. FIG. 22 illustrates an example of an updated operation result management table. As illustrated in FIG. 22, columns for input file size ratio, execution time ratio, and correlation value are added to the operation result management table 212 of FIG. 8. In the input file size ratio column, each entry contains a ratio of a corresponding input file size to the base file size. In the execution time ratio column, each entry contains a ratio of a corresponding execution time to the base execution time. In the correlation value column, each entry contains a value obtained by dividing a corresponding execution time ratio by a corresponding input file size ratio. In addition to the entries for the operation result records, the correlation value column also includes the average of the correlation values (average correlation value).

The following description returns to FIG. 21.

[Step S213] The correlation analyzing unit 223 creates a correlation formula used to calculate an input file size that the modification job is able to process within a designated time. For example, the correlation analyzing unit 223 creates the correlation formula using the base execution time, base file size, and average correlation value. The correlation formula finds the input file size by multiplying the base file size by a division result obtained by dividing a time frame allowed to execute the modification job, '&time' (variable), by the base execution time and the average correlation value. That is, the correlation formula is: &time/base execution time/average correlation value×base file size.

According to the example of FIG. 22, the correlation formula is '&time/611 s/1.043838×1.33 GB'. When the amount of time to be allocated to the execution of the modification job during the operation is plugged for '&time', the correlation formula finds the amount of input data processable in the time frame. In addition, it is possible to back-calculate the value of '&time' allowing the calculation result of the correlation formula to be the output data volume of the extraction job. In this case, the value of '&time' represents the time needed for the modification job to process the output data amount (estimated execution time). The correlation analyzing unit 223 registers the created correlation formula in the job definition information 211. FIG. 23 illustrates an example of job definition information in which a correlation formula is registered. As illustrated in FIG. 23, a correlation formula is set in association with a corresponding job whose extraction job flag is set to ON.

The following description returns to FIG. 21.

[Step S214] The correlation analyzing unit 223 determines whether all the modification jobs have been processed. If all the modification jobs have been processed, the procedure moves to step S215. If there is an unprocessed modification job, the procedure moves to step S205.

[Step S215] The correlation analyzing unit 223 determines whether all the jobs registered in the job definition information 211 have been processed. If there is an unprocessed job, the procedure moves to step S201. If all the jobs have been processed, the correlation formula deriving process ends.

Figure 24:
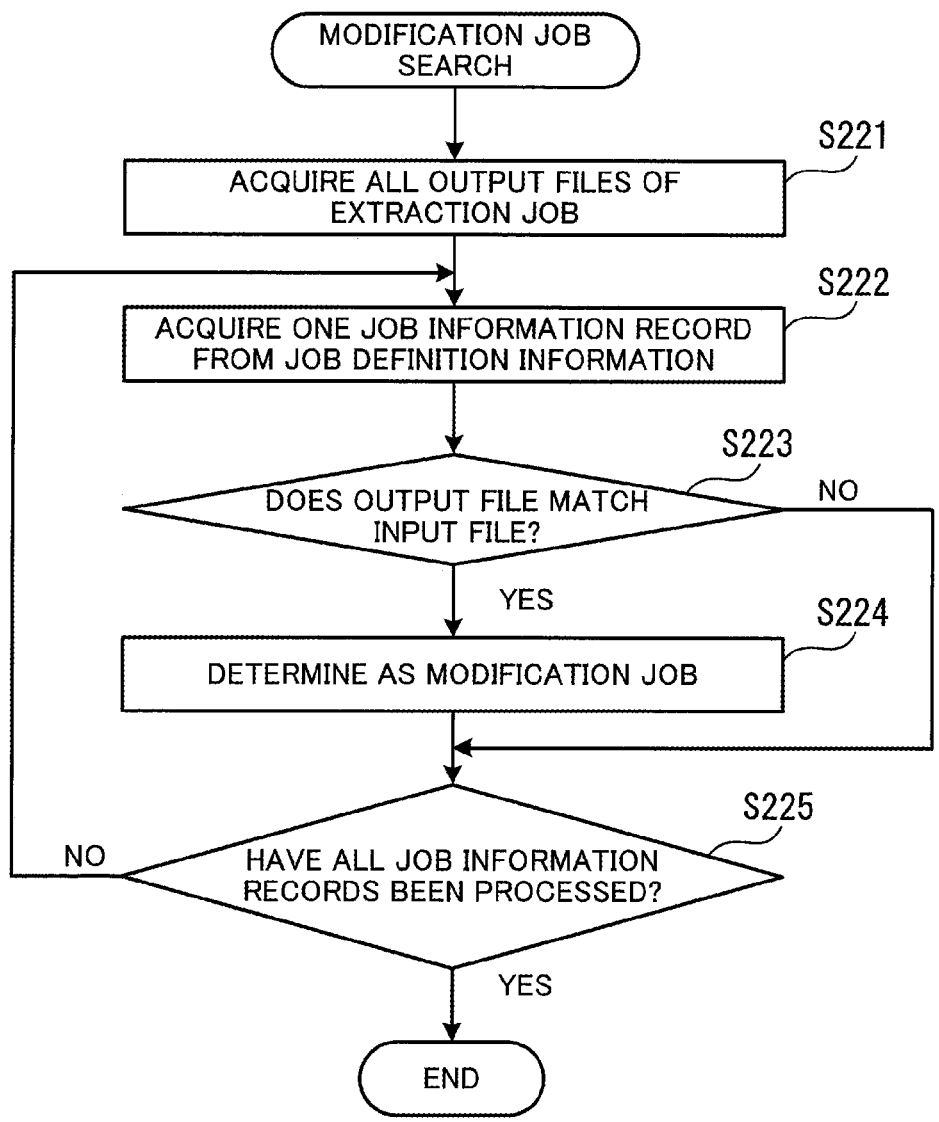
FIG. 24 is a flowchart illustrating an example of a procedure of a modification job search process.

In the procedure described above, a correlation formula between an extraction job and a corresponding modification job is derived. Next described is a procedure for searching modification jobs. FIG. 24 is a flowchart illustrating an example of a procedure of a modification job search process.

[Step S221] The correlation analyzing unit 223 acquires all output files of the extraction job. For example, by referring to the job definition information 211, the correlation analyzing unit 223 acquires identification information of the output files of the extraction job.

[Step S222] The correlation analyzing unit 223 acquires one job information record from the job definition information 211.

[Step S223] The correlation analyzing unit 223 determines whether the identification information of the output file of the extraction job matches that of the input file of the acquired record. If the two match, the procedure moves to step S224. If not, the procedure moves to step S225.

[Step S224] The correlation analyzing unit 223 determines the job represented by the acquired record as a modification job corresponding to the extraction job.

[Step S225] The correlation analyzing unit 223 determines whether all the job information records registered in the job definition information 211 have been processed. If all the job information records have been processed, the modification job search process ends. If there is an unprocessed job information record, the procedure moves to step S222.

In the above-described manner, the test environment server 200 determines extraction jobs and then obtains correlation formulae each representing the correlation between one of the extraction jobs and its corresponding modification job. The obtained information is used to detect job delay during the batch processing. For example, the administrator transfers the information of the management database 210 stored in the test environment server 200 to the operational environment server 100.

Figure 25:
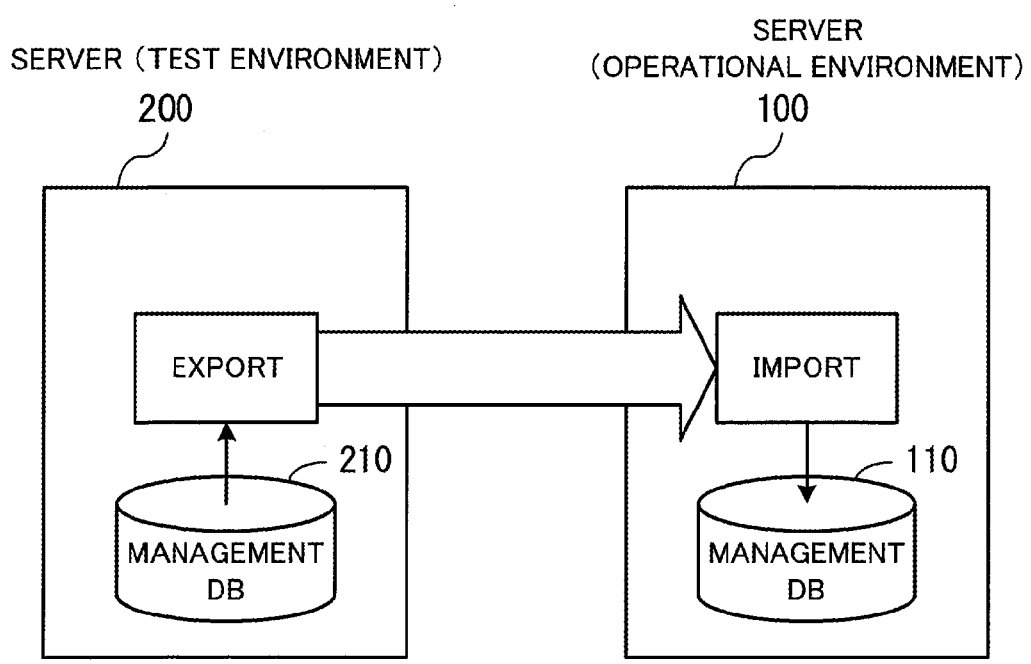
FIG. 25 illustrates an example of information transfer between management databases.

FIG. 25 illustrates an example of information transfer between management databases. The test environment server 200 exports information from the management database 210 and transmits the information to the operational environment server 100. The operational environment server 100 imports the received information into a management database 110. The server 100 detects job delay by referring to the information stored in the management database 110 when executing jobs of the batch processing.

Figure 26:
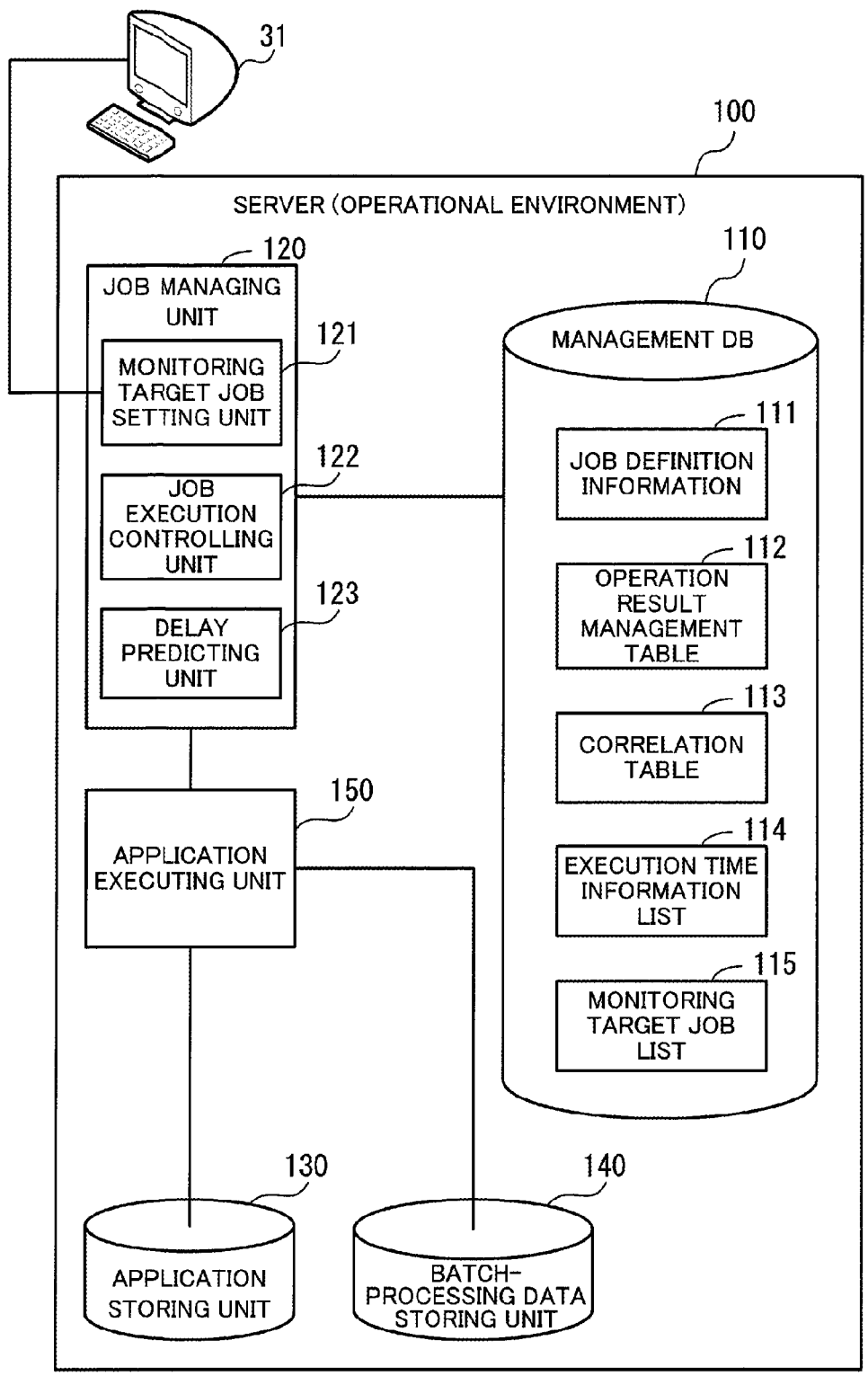
FIG. 26 illustrates functions of a server operating in an operational environment.

Next described in detail is processing executed in the operational environment server 100. FIG. 26 illustrates functions of a server operating in an operational environment. The server 100 includes the management database (DB) 110, a job managing unit 120, an application storing unit 130, a batch-processing data storing unit 140, and an application executing unit 150.

The management database 110 stores therein job definition information 111, an operation result management table 112, a correlation table 113, an execution time information list 114, and a monitoring target job list 115. The job definition information 111 has the same content as the job definition information 211 of FIG. 23. The operation result management table 112 has the same content as the operation result management table 212 of FIG. 22. The correlation table 113 has the same content as the correlation table 213 of FIG. 9. The execution time information list 114 has the same content as the execution time information list 214 of FIG. 10. The monitoring target job list 115 is a list of jobs to be monitored for delay detection (monitoring target jobs).

The job managing unit 120 executes preliminarily designated batch processing jobs and detects job delay. To do so, the job management unit 120 includes a monitoring target job setting unit 121, a job execution controlling unit 122, and a delay predicting unit 123.

The monitoring target job setting unit 121 sets jobs to be monitored for delay detection and also sets the scheduled end time of each of the monitoring target jobs. For example, the monitoring target job setting unit 121 transmits the execution time information list 114 to the terminal 31 used by the administrator and receives inputs regarding scheduled end times of modification jobs. The monitoring target job setting unit 121 designates each modification job for which a scheduled end time has been input as a monitoring target job. Subsequently, the monitoring target job setting unit 121 generates the monitoring target job list 115 which is then stored in the management database 110.

The job execution controlling unit 122 executes jobs of the batch processing in the operational environment in the order according to job nets. Note that the job nets of the batch processing are preliminarily set in the server 100.

The delay predicting unit 123 predicts the occurrence of job delay during the execution of a job during the batch processing. For example, based on the data amount of the output file of an extraction job executed prior to a monitoring target job, the delay predicting unit 123 predicts whether the execution of the monitoring target job is finished by the scheduled end time set for the monitoring target job. In the case of predicting that the monitoring target job is not finished by the scheduled end time, the delay predicting unit 123 outputs an alarm message.

The application storing unit 130, the batch-processing data storing unit 140, and the application executing unit 150 have the same functions as the components with the same names, respectively, in the test environment server 200 of FIG. 6.

Figure 27:
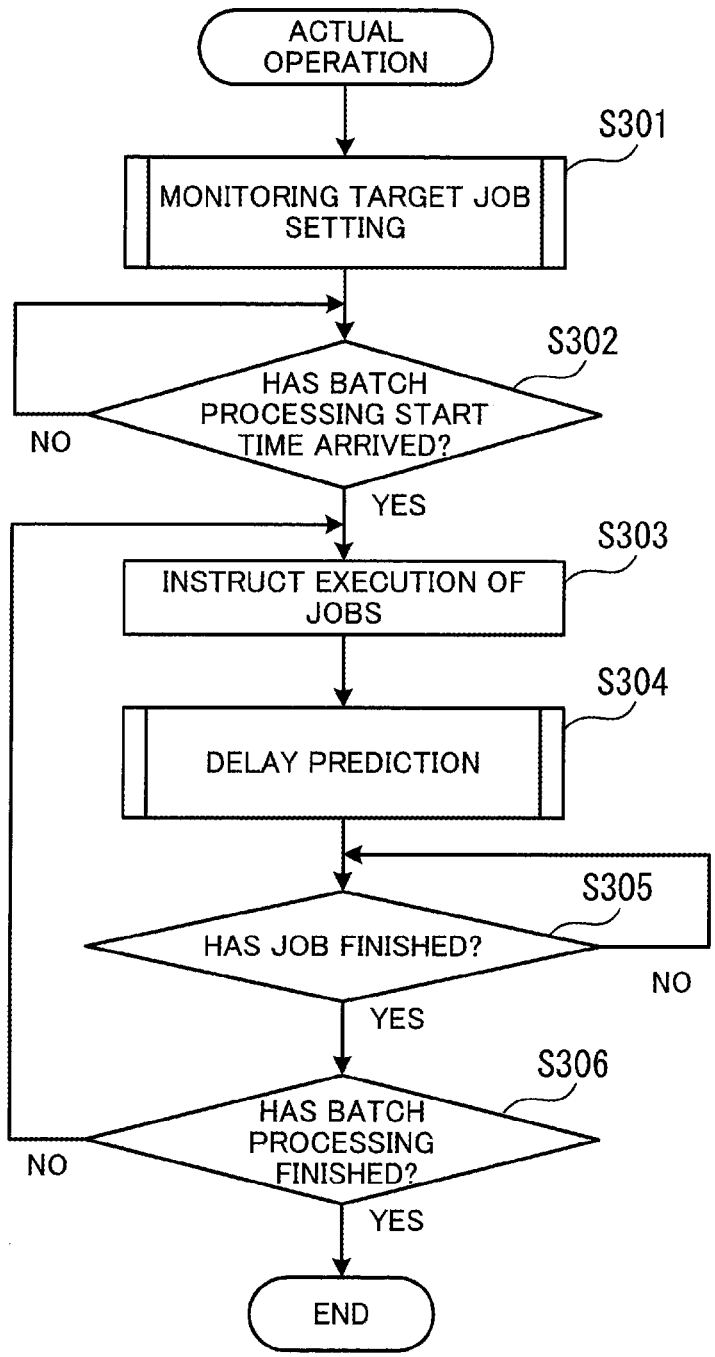
FIG. 27 is a flowchart illustrating an example of a processing procedure of the server for an actual operation.

Next described is a processing procedure of the operational environment server 100. FIG. 27 is a flowchart illustrating an example of a processing procedure of a server for an actual operation.

[Step S301] The monitoring target job setting unit 121 performs a monitoring target job setting process. The details of this process are described later (see FIG. 28).

[Step S302] The job execution controlling unit 122 determines whether it is the time to start the batch processing. Note that the start time of the batch processing is set in advance. When the start time comes, the procedure moves to step S303. If the start time has not arrived yet, the procedure repeats step S302.

[Step S303] When the batch processing start time comes, the job execution controlling unit 122 instructs the application executing unit 150 to execute jobs in the order defined in the job nets. In response to the instruction, the application executing unit 150 starts the execution of the jobs.

[Step S304] The delay predicting unit 123 performs a delay prediction process. The delay prediction process takes place when the execution of a job is started, and makes a prediction of whether a delay occurs in a job to be executed after the currently executed job, based on the execution status of the currently executed job. The details of the delay prediction process are described later (see FIG. 33).

According to the second embodiment, if the job being executed is an extraction job, the delay prediction process is executed until the end of the job, except for when an alarm is activated. When an alarm is activated in the delay prediction process, the delay prediction process ends without waiting for the end of the job being executed. In addition, if the job being executed is not an extraction job, the delay prediction process ends without waiting for the execution of the job to finish.

[Step S305] The job execution controlling unit 122 determines whether the execution of the job has finished. For example, when receiving a response indicating the job execution end from the application executing unit 150, the job execution controlling unit 122 determines that the execution of the job has finished. If the execution of the job has finished, the procedure moves to step S306. If not, the job execution controlling unit 122 repeats step S305, waiting for the job to finish.

[Step S306] The job execution controlling unit 122 determines whether the batch processing has finished. For example, when the execution of the last job in the job nets is finished, the job execution controlling unit 122 determines that the batch processing has finished. When the batch processing is finished, the procedure ends. If there is a job yet to be executed in the batch processing, the procedure moves to step S303 and a subsequent job is executed.

In the above-described procedure, the batch processing is executed.

Figure 28:
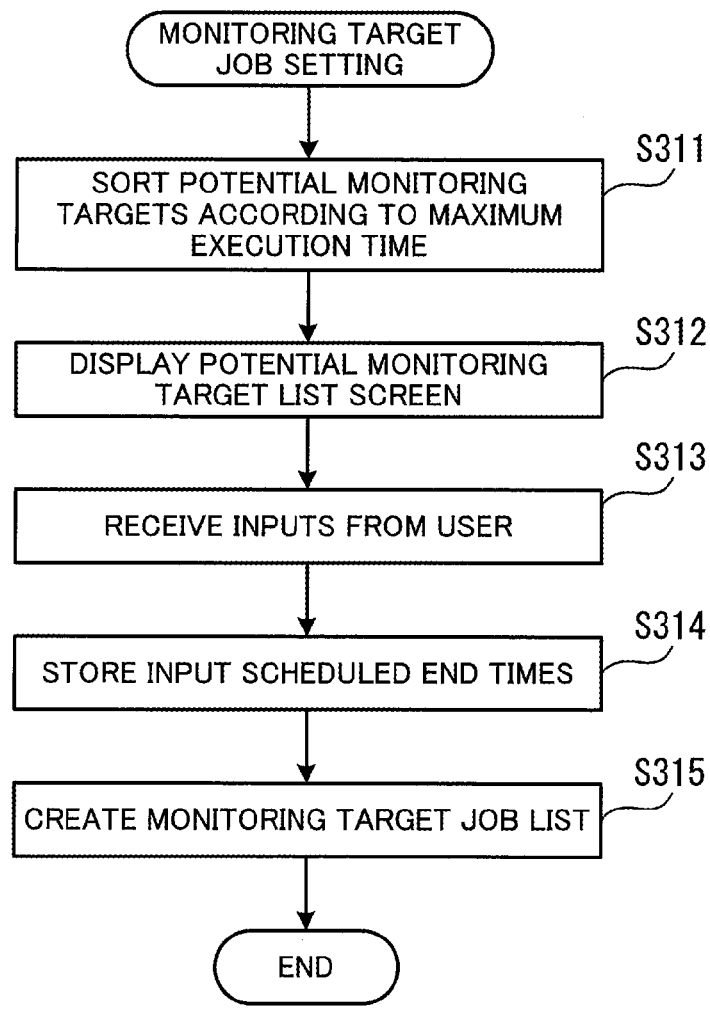
FIG. 28 is a flowchart illustrating an example of a procedure of a monitoring target job setting process.

The monitoring target job setting process is described next in detail. FIG. 28 is a flowchart illustrating an example of a procedure of a monitoring target job setting process.

[Step S311] The monitoring target job setting unit 121 sorts potential monitoring targets in the execution time information list 114 according to the maximum execution time.

[Step S312] The monitoring target job setting unit 121 displays a potential monitoring target list screen on the terminal 31 used by a user (for example, the system administrator).

[Step S313] The monitoring target job setting unit 121 receives designation of monitoring target jobs and an input of the scheduled end time for each of the monitoring target jobs from the user via the terminal 31.

[Step S314] The monitoring target job setting unit 121 stores the input scheduled end times in the job definition information 111.

[Step S315] The monitoring target job setting unit 121 creates the monitoring target job list 115. For example, the monitoring target job setting unit 121 copies records registered in the correlation table 113. Then, the monitoring target job setting unit 121 adds the scheduled end times of the monitoring target jobs and the correlation formulae registered in the job definition information 111 to the copied records, to thereby create the monitoring target job list 115.

Figure 29:
FIG. 29 illustrates an example of a sorted execution time information list.

In this manner, the monitoring target job list 115 is generated. For example, records in the execution time information list 114 are sorted, as illustrated in FIG. 29, by the sorting process in step S311. FIG. 29 illustrates an example of a sorted execution time information list. As illustrated in FIG. 29, a record with a larger value of the maximum execution time is placed higher up in the sorted execution time information list 114. In the case where there are a plurality of records having the same value of the maximum execution time, a record with a larger value of the average execution time, for example, is listed higher up in the sorted execution time information list 114.

Based on the sorted execution time information list, a potential monitoring target list screen is displayed on the terminal 31.

FIG. 30 illustrates an example of a potential monitoring target list screen. A potential monitoring target list screen 50 is provided with a potential monitoring target display part 51 and a set key 52. The potential monitoring target display part 51 displays content of the execution time information list 114. That is, the potential monitoring target display part 51 displays a list of modification jobs in descending order of the maximum execution time. The modification jobs in the potential monitoring target display part 51 are potential monitoring targets.

In addition, the potential monitoring target display part 51 includes entry fields for scheduled end time, provided for the individual modification jobs. The user is allowed to input a scheduled end time for each modification job to be monitored. FIG. 31 is an example of a potential monitoring target list screen after scheduled end times are input. After inputting the scheduled end times, the user presses the set key 52. The set key 52 is a key to instruct the server 100 to set the input scheduled end times. When the set key 52 is pressed, the scheduled end times of the modification jobs to be monitored are transmitted from the terminal 31 to the server 100.

The server 100 generates the monitoring target job list 115 based on the transmitted scheduled end times. FIG. 32 illustrates an example of a monitoring target job list. The monitoring target job list 115 has a data structure in which, for example, the columns for scheduled end time and correlation formula are added to the correlation table 113. In the scheduled end time column, each entry contains a scheduled end time of a corresponding monitoring target job. In the correlation formula column, each entry contains a correlation formula of a corresponding monitoring target job.

Figure 33:
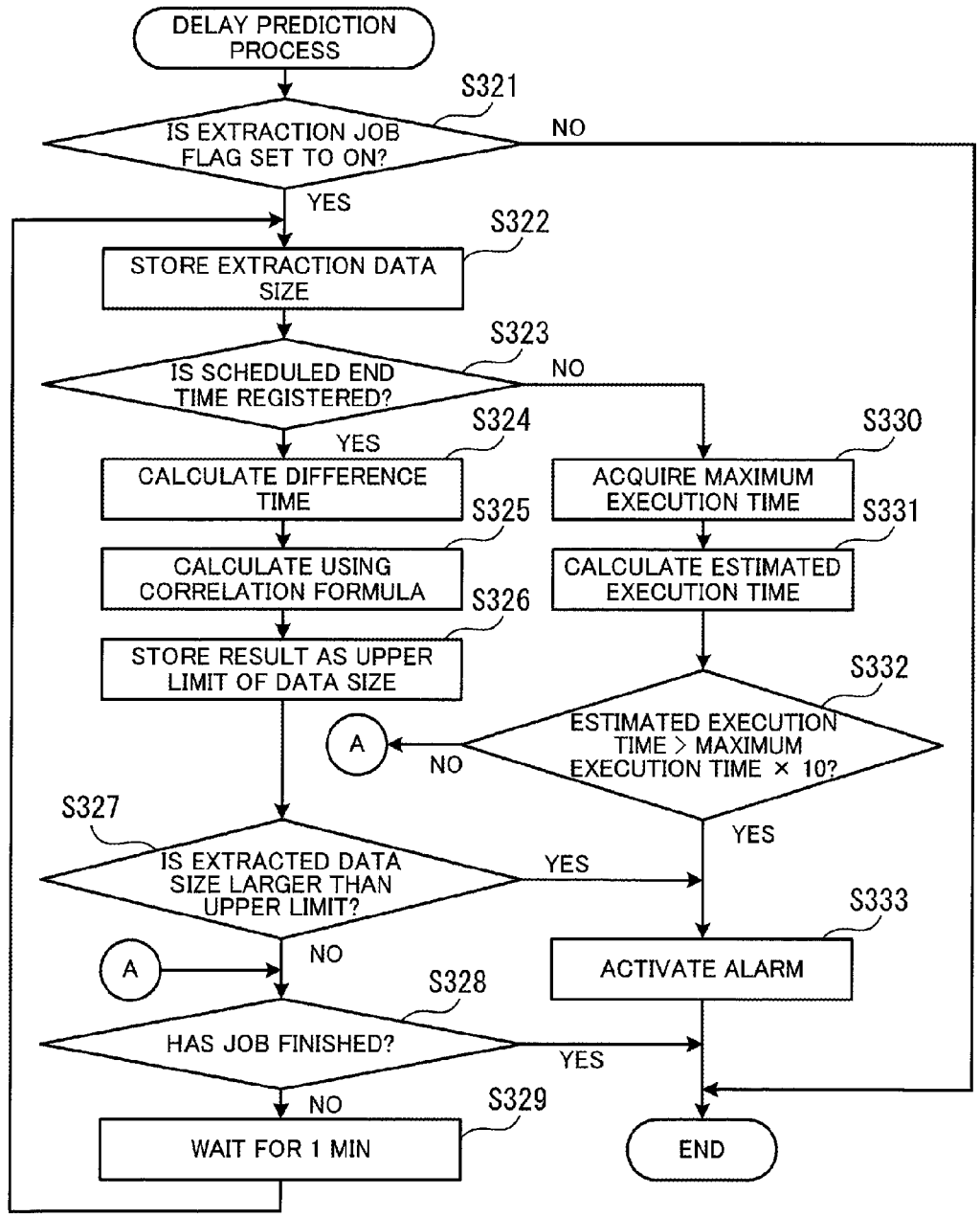
FIG. 33 is a flowchart illustrating an example of a procedure of a delay prediction process.

When the batch processing start time comes after the monitoring target job list 115 is created, jobs are executed in the order defined in the job nets and the delay prediction process is also performed. FIG. 33 is a flowchart illustrating an example of a procedure of a delay prediction process.

[Step S321] Referring to the job definition information 111, the delay predicting unit 123 determines whether the extraction job flag of a job to be executed is set to ON. If the extraction job flag is set to ON, the procedure moves to step S322. If the extraction job flag is set to OFF, the delay prediction process ends.

[Step S322] The delay predicting unit 123 acquires the size of data extracted by the job being executed (extraction job), and stores the data size in the monitoring target job list 115 in association with the extraction job being executed.

[Step S323] Referring to the monitoring target job list 115, the delay predicting unit 123 determines whether the scheduled end time of a modification job (monitoring target job) to be executed after the extraction job being executed is registered in association with the extraction job. If the scheduled end time is registered, the procedure moves to step S324. If not, the procedure moves to step S330.

[Step S324] When the scheduled end time is registered, the delay predicting unit 123 calculates a difference time associated with the scheduled end time. For example, the delay predicting unit 123 obtains the difference time by subtracting the current time from the scheduled end time registered in the monitoring target job list 115.

[Step S325] The delay predicting unit 123 performs calculation using a correlation formula of the extraction job being executed. For example, the delay predicting unit 123 acquires a corresponding correlation formula from the monitoring target job list 115. Then, the delay predicting unit 123 plugs in the difference time for '&time' into the correlation formula. This calculation produces the volume of data processable by the modification job within the difference time.

[Step S326] The delay predicting unit 123 stores, in the monitoring target job list 115, the calculation result of the correlation formula as the upper limit of the data size.

[Step S327] The delay predicting unit 123 determines whether the size of the extracted data is larger than the upper limit. If the extracted data size is larger than the upper limit, the procedure moves to step S333. If the extracted data size is less than or equal to the upper limit, the procedure moves to step S328.

[Step S328] The delay predicting unit 123 determines whether the extraction job has finished. If the extraction job is finished, the delay prediction process ends. If not, the procedure moves to step S329.

[Step S329] The delay predicting unit 123 waits for one minute. Subsequently, the procedure moves to step S322 in which the size of extracted data is again acquired.

[Step S330] When no scheduled end time is registered in association with the extraction job being executed, the delay predicting unit 123 acquires the maximum execution time of a modification job corresponding to the extraction job from the execution time information list 114.

[Step S331] The delay predicting unit 123 calculates the estimated execution time of the modification job based on a corresponding correlation formula. For example, the delay predicting unit 123 obtains such a variable '&time' that the calculation result of the correlation formula becomes the extracted data size acquired in step S322. The obtained value is the estimated execution time. For example, when the correlation formula is '&time/611 s/1.043838×1.33 GB', the calculation result of 'input file size/1.33 GB×611 s×1.043838' is the estimated execution time.

[Step S332] The delay predicting unit 123 determines whether the estimated execution time is larger than ten times the maximum execution time. If the estimated execution time is larger than ten times the maximum execution time, the procedure moves to step S333. If the estimated execution time is less than or equal to ten times the maximum execution time, the procedure moves to step S328.

[Step S333] In the case where the scheduled end time is registered, the delay predicting unit 123 predicts a delay in the modification job and activates an alarm if the extracted data size is larger than the upper limit. On the other hand, in the case where no scheduled end time is registered, the delay predicting unit 123 predicts a delay in the modification job and activates an alarm if the estimated execution time is larger than ten times the maximum execution time. Subsequently, the delay prediction process ends.

Delay prediction is made in the above-described manner. Note that, as illustrated in FIG. 33, the second embodiment supports monitoring target jobs for which no scheduled end times are registered. This is because a large number of jobs, including jobs that do not need to be monitored, may be displayed on the potential monitoring target list screen 50 since all jobs using the output file of the extraction job as their input are displayed in the list. Jobs that do not need to be monitored are, for example, jobs having very short maximum and average execution times. It is not practical to register scheduled end times for all jobs when a large number of jobs are displayed in the list. Therefore, scheduled end times may not be registered for monitoring target jobs, for example, whose execution times are known not to be very long even if their input files become large in size.

FIG. 34 illustrates an example of a monitoring target job list during a delay prediction process. When the delay prediction process is started, columns for extracted data size and data size upper limit are added to the monitoring target job list 115. In the extracted data size column, each entry contains the amount of data having been extracted by a corresponding extraction job. In the data size upper limit column, each entry contains the upper limit of the data amount processable by a corresponding modification job by the scheduled end time.

The extracted data size increases as the processing of the extraction job progresses. On the other hand, the data size upper limit decreases as the processing of the extraction job progresses (because the remaining time before the scheduled end time decreases). If the extraction job finishes while the extracted data size remains less than or equal to the data size upper limit, no alarm is set off.

However, when a data amount beyond the amount originally projected is extracted by the extraction job, the extracted data size may exceed the data size upper limit. FIG. 35 illustrates an example of a monitoring target job list when an alarm is activated. According to the example of FIG. 35, as for the extraction job with the job name 'job001', the extracted data size has exceeded the data size upper limit.

When such a condition is detected, the delay predicting unit 123 activates an alarm. The alarm is displayed, for example, on the screen of the terminal 31 used by the user. FIG. 36 illustrates an example of an alarm display screen. An alarm display screen 60 includes the following items: detected time; job net name; job name being in execution; monitoring target job name; estimated execution time of monitoring target job; expected execution end time of monitoring target job; and status of monitoring target job.

The 'detected time' is the time when a prediction of the occurrence of a delay was made. The 'job net name' is the name of a job net including a job expected to experience a delay. The 'job name being in execution' is the name of a job being executed (i.e., an extraction job being executed prior to the job expected to experience a delay). The 'monitoring target job name' is the name of the job expected to experience a delay. The 'estimated execution time of monitoring target job' is an estimated time frame needed to execute the job expected to experience a delay. The 'expected execution end time of monitoring target job' is an estimated execution end time of the job expected to experience a delay. The 'status of monitoring target job' is a current status of the job expected to experience a delay. For example, if the preceding job is in execution, the status of the job expected to experience a delay is 'execution wait'.

In addition to the delay prediction of the job execution, the alarm display screen 60 displays, for example, a message urging the user to make a response. Further, the alarm display screen 60 displays a list of jobs following the job being executed and a list of jobs following the job expected to experience a delay. For example, if there are other jobs that use the extraction file of the job being executed and are executed in parallel with the job expected to experience a delay, these jobs are displayed in the former list (i.e. the list of jobs following the job being executed). The latter list (the list of jobs following the job expected to experience a delay) displays, for example, a predetermined number of jobs to be sequentially executed after the job expected to experience a delay, in the execution order.

By checking such an alarm display screen, the user is able to recognize an expected delay in the job execution and implement measures to finish jobs of the job nets within the execution time frame allowed for the batch processing. For example, if jobs whose execution may be reserved for the following day are included in subsequent jobs following the job expected to experience a delay, the user is able to exclude such jobs from the execution targets of the day.

As described above, according to the second embodiment, a delay in the batch processing is predictively detected at an early stage, and it is therefore possible to prevent the delay from having an impact on the business operation, such as online stop on the following day. That is, it is possible to predictively detect a delay before starting the execution of a long run job of processing large quantities of data. In addition, even in the case of a sudden increase in the amount of data to be processed, a delay is predictively detected at an early stage.

In addition, according to the second embodiment, monitoring target jobs (modification jobs each using the extraction file of a corresponding extraction job) are detected automatically. This eliminates the need of the user to manually analyze operation results, and also allows appropriate jobs to be monitored for a delay.

Furthermore, according to the second embodiment, a job is determined as an extraction job when the job satisfies a plurality of attributes of an extraction job. Therefore, extraction jobs are determined with a high degree of accuracy.

In addition, according to the second embodiment, correlations are derived not for all pairs of one job passing a file and the other receiving the file, but for only pairs of an extraction job and a modification job using a file output from the extraction job as its input. This reduces a processing load in the correlation derivation. In this connection, the correlation derivation is made based on operation result data collected only from jobs using the latest applications to be released to the actual operational environment from now. This prevents a decrease in the accuracy of the correlation derivation.

In addition, limiting targets to extraction jobs reduces the consumption of resources (CPU and memory) compared to the case of predicting the occurrence of a job delay based on the output file size of every single job.

Note that, in the second embodiment, the test environment server 200 and the operational environment server 100 are provided independently, however, the test environment and the operational environment may be housed in a single server.

According to one aspect, the occurrence of a delay in job execution is predicted at an early stage.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing therein a computer program that causes a computer to execute a process comprising:
   determining, as a first job amongst a plurality of jobs to be executed, a job of extracting records satisfying an extraction condition from an input file and outputting the extracted records;
   monitoring, during execution of the first job, an amount of data output by the execution of the first job; and predicting, based on the amount of data output by the execution of the first job, whether execution of a second job finishes by a preset time limit, the second job performing a process using the data output by the execution of the first job;

wherein the determining includes comparing write data output by the job as the extracted records with read data extracted by the job as the extracted records when the job is executed, and determining the job as the first job when the write data matches the read data.

2. The non-transitory computer-readable recording medium according to claim 1, wherein:
the determining includes judging whether to determine a job as the first job, based on whether the job reads all records from the input file by a predetermined amount each time when the job is executed.

3. The non-transitory computer-readable recording medium according to claim 1, wherein:
the determining includes judging whether to determine a job as the first job, based on whether identification information of a file, to which the records satisfying the extraction condition are output by the execution of the job, is designated in a file defining the extraction condition.

4. The non-transitory computer-readable recording medium according to claim 1, wherein:
the determining includes judging whether to determine a job as the first job, based on whether a file defining the extraction condition is read in a single read process when the job is executed.

5. The non-transitory computer-readable recording medium according to claim 1, wherein:
the predicting includes comparing the amount of data output by the execution of the first job and an amount of data processable by the execution of the second job by the time limit.

6. The non-transitory computer-readable recording medium according to claim 1, wherein:
the predicting includes activating an alarm when the amount of data output by the execution of the first job exceeds an amount of data processable by the execution of the second job by the time limit.

7. The non-transitory computer-readable recording medium according to claim 1, wherein:
the predicting includes estimating an execution time of the second job based on the amount of data output by the execution of the first job, and predicting, based on the estimated execution time, whether the execution of the second job finishes by the time limit.

8. The non-transitory computer-readable recording medium according to claim 1, wherein:
the process further comprises:
determining, as the second job, a process using the records output by the execution of the determined first job; and
displaying the determined second job and receiving an input of the time limit of the second job.

9. A job delay detection method comprising:
determining, as a first job amongst a plurality of jobs to be executed, a job of extracting records satisfying an extraction condition from an input file and outputting the extracted records;
monitoring, during execution of the first job, an amount of data output by the execution of the first job; and
predicting, by a processor, based on the amount of data output by the execution of the first job, whether execution of a second job finishes by a preset time limit, the second job performing a process using the data output by the execution of the first job;
wherein the determining includes comparing write data output by the job as the extracted records with read data extracted by the job as the extracted records when the job is executed, and determining the job as the first job when the write data matches the read data.

10. An information processing apparatus comprising:
a processor configured to perform a process including:
determining, as a first job amongst a plurality of jobs to be executed, a job of extracting records satisfying an extraction condition from an input file and outputting the extracted records;
monitoring, during execution of the first job, an amount of data output by the execution of the first job; and
predicting, by a processor, based on the amount of data output by the execution of the first job, whether execution of a second job finishes by a preset time limit, the second job performing a process using the data output by the execution of the first job;
wherein the determining includes comparing write data output by the job as the extracted records with read data extracted by the job as the extracted records when the job is executed, and determining the job as the first job when the write data matches the read data.

* * * * *